(12) United States Patent
Marchionni et al.

(10) Patent No.: US 8,278,256 B2
(45) Date of Patent: Oct. 2, 2012

(54) FLUORINATED LUBRICANTS

(75) Inventors: Giuseppe Marchionni, Milan (IT); Pier Antonio Guarda, Arese (IT); Marco Avataneo, Senago (IT)

(73) Assignee: Solvay Solexis S.p.A., Bollate (IT)

( * ) Notice: Subject to any disclaimer, the term of this patent is extended or adjusted under 35 U.S.C. 154(b) by 561 days.

(21) Appl. No.: 12/516,158

(22) PCT Filed: Nov. 29, 2007

(86) PCT No.: PCT/EP2007/063000
§ 371 (c)(1),
(2), (4) Date: May 22, 2009

(87) PCT Pub. No.: WO2008/065165
PCT Pub. Date: Jun. 5, 2008

(65) Prior Publication Data
US 2010/0069275 A1 Mar. 18, 2010

(30) Foreign Application Priority Data
Nov. 30, 2006 (IT) .............................. MI2006A2306

(51) Int. Cl.
*C10M 105/18* (2006.01)
(52) U.S. Cl. ........................................ 508/582; 568/615
(58) Field of Classification Search .................. 508/582; 568/677, 615
See application file for complete search history.

(56) References Cited

U.S. PATENT DOCUMENTS

| | | | |
|---|---|---|---|
| 3,214,478 A | 10/1965 | Milian | |
| 3,242,218 A | 3/1966 | Miller | |
| 3,493,530 A | 2/1970 | Sianesi et al. | |
| 3,665,041 A | 5/1972 | Sianesi et al. | |
| 3,715,378 A | 2/1973 | Sianesi et al. | |
| 3,810,874 A | 5/1974 | Mitsch et al. | |
| 3,847,978 A | 11/1974 | Sianesi et al. | |
| 3,882,193 A * | 5/1975 | Rice et al. ..................... | 528/271 |
| 4,451,646 A | 5/1984 | Sianesi et al. | |
| 4,523,039 A | 6/1985 | Lagow et al. | |
| 4,721,795 A | 1/1988 | Caporiccio et al. | |
| 4,757,145 A | 7/1988 | Caporiccio et al. | |
| 5,000,830 A | 3/1991 | Marchionni et al. | |
| 5,124,058 A | 6/1992 | Corti et al. | |
| 5,258,110 A | 11/1993 | Sianesi et al. | |
| 5,744,651 A | 4/1998 | Marchionni et al. | |
| 6,509,509 B2 | 1/2003 | Tonelli et al. | |
| 2004/0230080 A1 | 11/2004 | Picozzi et al. | |
| 2005/0192413 A1 | 9/2005 | Marchionni et al. | |

FOREIGN PATENT DOCUMENTS

| | | |
|---|---|---|
| EP | 148482 A2 | 7/1985 |
| EP | 0320005 A2 | 6/1989 |
| EP | 1454938 A1 | 9/2004 |
| EP | 1568730 A1 | 8/2005 |
| GB | 1104482 A | 2/1968 |
| GB | 1226566 A | 3/1971 |
| WO | WO03/100159 A1 | 12/2003 |

OTHER PUBLICATIONS

U.S. Appl. No. 12/516,048, filed May 22, 2009, Avataneo et al., Intl. Filing Date Nov. 29, 2007.
U.S. Appl. No. 12/516,086, filed May 22, 2009, Abusleme et al., Intl. Filing Date Nov. 29, 2007.
C. Tonelli, P. Gavezotti, E. Strepparola, "Linear perfluoropolyether difunctional oligomers: chemistry, properties and applications", Journal of Fluorine Chemistry, vol. 95 (1999) p. 51-70 (20 pp.).
ASTM 2595-96 (2002), Standard Test Method for Evaporation Loss of Lubricating Greases Over Wide-Temperature Range, Reapproved 2002, 4 pp.
ASTM D 2266-01, Standard Test Method for Wear Preventive Characteristics of Lubricating Grease (Four-Ball Method), 2001, 4 pp.
ASTM D 4172-94 (2004), Standard Test Method for Wear Preventive Characteristics of Lubricating Fluid (Four-Ball Method), Reapproved 2004, 6 pp.

* cited by examiner

*Primary Examiner* — Jim Goloboy
(74) *Attorney, Agent, or Firm* — Arent Fox LLP

(57) ABSTRACT

Polymers of formula $$Q\text{-}O\text{-}[A\text{-}B]_z\text{-}[A\text{-}B']_{z'}\text{-}A\text{-}Q' \qquad (I)$$

wherein:
A=-$(X)_a$—O-A'-$(X')_b$— with A'=perfluoropolyether chain and X, X'=—$CF_2$—, —$CF_2CF_2$—; a, b=0,1 with the proviso that a=1 if A is linked to Q-O—; b=0 when A is linked to Q';
B derives from homopolymerizable olefins by radical route, of formula:

$$-[(CR_1R_2-CR_3R_4)_j(CR_5R_6-CR_7R_8)_{j'}]- \qquad (Ia)$$

wherein
j is an integer from 1 to 30, j' is an integer from 0 to 29 with the proviso that (j+j') is higher than 2 and lower than 30; $R_1$-$R_8$ are halogen; H; $C_1$-$C_6$ (per)haloalkyl; $C_1$-$C_6$ alkyl; or $C_1$-$C_6$ oxy(per)fluoroalkyl; B'=B but at least one among $R_1$-$R_8$ has a meaning different from that in B;
z, z' are such that the number average molecular weight of the polymer of formula (I) is between 500 and 150,000;
Q, Q'=$C_1$-$C_3$ (per)fluoroalkyl or functional end group —(CFW)-$D_q$-$T_k$; W=F, $CF_3$; k and q are integers, k ranges from 1 to 4, q is an integer and is equal to 0 or 1;
with the proviso that at least one of Q, Q' is functional end group.

11 Claims, No Drawings

FLUORINATED LUBRICANTS

CROSS-REFERENCE TO RELATED APPLICATIONS

This application is a U.S. national stage application under 35 U.S.C. §371 of International Application No. PCT/EP2007/063000 filed Nov. 29, 2007, which claims priority to Italian Application No. MI2006A002306 filed Nov. 30, 2006, these applications being incorporated herein by reference in their entirety for all purposes.

The present invention relates to perfluoropolyether-based polymers having an improved combination of low wear, low evaporation losses and with an improved maintenance of these properties, and their use as lubricants.

In particular the present invention refers to polymers containing at least one functional end group, having alternated blocks -A-B-A-B-A- wherein blocks A derive from perfluoropolyether and blocks B derive from halogenated and/or hydrogenated olefins, said polymers having improved wear in combination with improved evaporation losses (low values) and improved maintenance of these properties.

The fluoropolyethers having functional end groups, as known, are used in various fields, for example as lubricants with improved surface adhesion properties or in the preparation of polymers by polycondensation or polyaddition reactions with improved properties at low temperatures. See for example C. Tonelli, P. Gavezotti, E. Strepparola, Journal of Fluorine Chemistry, 95 (1999) 51-70. One example is represented by the lubrication of magnetic media.

The lubricants require a low wear and a good adhesion to the surface to be lubricated. The lubricants, oils or greases, based on perfluoropolyethers having perfluoroalkyl end groups, have a high thermal and chemical stability and a wide application range, in particular at low temperatures. However they have the disadvantage to show wear generally higher than those of the hydrogenated lubricants. Further, in these compounds, the wear increases as the molecular weight increases. The wear can be decreased by adding specific additives. However the conventional additives, as molybdenum sulphide, are not soluble in the perfluoropolyether oil, for example perfluoropolyether lubricants, as Fomblin® Z and M commercialized by Solvay Solexis.

Fluorinated additives, in particular containing perfluoropolyether chains, showing an improved compatibility and solubility in perfluoropolyether oils are also known. However these additives have the disadvantage to be easily lost due to their high evaporation, in particular in those applications wherein high vacuum and high temperatures are required.

Functionalized fluoropolyether lubricants commercialized by Solvay Solexis having improved antiwear and surface adhesion properties are also known. See for example U.S. Pat. No. 5,124,058, U.S. Pat. No. 4,721,795. These functionalized fluoropolyethers are used as lubricants as such, in applications for example in magnetic media (NMR) or, as said, as additives for non functionalized perfluoropolyethers. The drawback of the functionalized fluoropolyethers resides in suffering high evaporation loss. In general the molecular weights of commercial products generally range between 1,000 and 4,000.

Functionalized fluoropolyether lubricants having higher molecular weights up to about 8,000 are also known. See for example U.S. Pat. No. 4,757,145. However, in order to obtain these polymers with number average molecular weight higher than 4,000, particular techniques are required, as for example fractionations with supercritical $CO_2$. Another disadvantage of these products is that the yield decreases with the increase of molecular weight. Besides, these processes are extremely complex and very expensive.

The need was therefore felt to have available fluoropolyethers usable as lubricants having improved wear and substantially independent from their molecular weight, in combination with a low evaporation loss and with a longer maintenance of said properties and obtainable with a simple process in a wide range of molecular weights.

The Applicant has surprisingly and unexpectedly found specific fluoropolyether polymers capable to solve the above technical problem.

An object of the present invention are fluoropolyether polymers of formula (I)

$$Q\text{-}O\text{-}[A\text{-}B]_z\text{-}[A\text{-}B']_{z'}\text{-}A\text{-}Q' \qquad (I)$$

wherein:

$A = -(X)_a - O - A' - (X)_b -$ wherein A' is a perfluoropolyether chain comprising one or more repeating units selected from $(CF_2O)$, $(CF_2CF_2O)$, $(CF_2CF_2CF_2O)$, $(CF_2CF_2CF_2CF_2O)$, $(CF(CF_3)O)$, $(CF(CF_3)CF_2O)$, $(CF_2CF(CF_3)O)$, X, X', equal to or different from each other, are selected from $-CF_2-$, $-CF_2CF_2-$, $-CF(CF_3)-$;

a, b, equal to or different from each other, are 0 or 1;

with the proviso that the block A linked to the end group Q-O— has a=1 and the block A linked to the end group Q' has b=0;

B is a block formed of units deriving from one or more olefins, wherein at least one of them is homopolymerizable by radical route, having formula:

$$-[(CR_1R_2-CR_3R_4)_j(CR_5R_6-CR_7R_8)_{j'}]- \qquad (Ia)$$

wherein j is an integer from 1 to 30, j' is an integer from 0 to 29, with the proviso that (j+j') is higher than 2 and lower than 30;

$R_1$, $R_2$, $R_3$, $R_4$, $R_5$, $R_6$, $R_7$, $R_8$, equal to or different from each other, are selected from halogen, preferably F, Cl; H; $C_1$-$C_6$ (per)haloalkyl, wherein the halogen is preferably F, Cl; $C_1$-$C_6$ alkyl, optionally containing heteroatoms, as O, N, S; $C_1$-$C_6$ oxy(per)fluoroalkyl; said substituents $R_1$-$R_8$ optionally containing one or more functional groups;

B' is a block deriving from one or more olefins and has formula (Ia) but having at least one of the substituents $R_1$ to $R_8$ different than in block B, (j+j') being higher than or equal to 2 and lower than 30;

z is an integer higher than or equal to 2; z' is 0 or an integer;

z, z' are such that the number average molecular weight of the polymer of formula (I) is in the range 500-150,000, preferably 600-50,000, more preferably 800-40,000;

Q is a $C_1$-$C_3$ (per)fluoroalkyl end group or a functional end group of formula $-(CFW)\text{-}D_q\text{-}T_k$;

Q' is a $C_1$-$C_3$ (per)fluoroalkyl end group or a functional end group of formula $-(CFW)\text{-}D'_q\text{-}T'k$;

W=F, $CF_3$;

k is an integer ranging from 1 to 4, preferably 1 or 2;

q is an integer equal to 0 or 1;

D, D' is a bridging group;

with the proviso that at least one of Q or Q' is functional end group.

Preferably, the molar ratio between functional end groups and non functional end groups is higher than 1.

A' has preferably a number average molecular weight between 66 and 50,000. More preferably A' has a number average molecular weight between 300 and 10,000, still more preferably between 500 and 5,000.

Preferably in the polymers of formula (I) the repeating units of A' comprise one or more units selected from $(CF_2O)$, $(CF_2CF_2O)$, $(CF_2CF_2CF_2O)$, $(CF_2CF_2CF_2CF_2O)$, optionally comprising $(CF(CF_3)O)$, $(CF(CF_3)CF_2O)$, $(CF_2CF(CF_3)O)$; X, X', equal to or different from each other, are $-CF_2-$, $-CF_2CF_2-$ and optionally $-CF(CF_3)-$.

When the units constituting A' are linear, for example $(CF_2O)$, $(CF_2CF_2O)$, $(CF_2CF_2CF_2O)$, $(CF_2CF_2CF_2CF_2O)$, the polymers of formula (I) generally have Q, Q' both functional, and X, X', equal to or different from each other, are $-CF_2-$, $-CF_2CF_2-$. When the repeating units constituting A' are instead of branched type $(CF(CF_3)O)$, $(CF(CF_3)CF_2O)$, $(CF_2CF(CF_3)O)$, generally the polymer (I) is monofunctional, what means that only Q or Q' is functional and X, X', equal to or different from each other, are $-CF_2-$, $-CF_2CF_2-$, $-CF(CF_3)-$.

When instead the polymer (I) comprises both linear and branched repeating units, the polymer can be monofunctional or bifunctional, i.e. only one of Q, Q' is functional or both Q, Q' are functional.

A is preferably selected from the following structures:

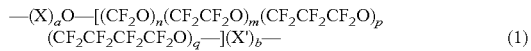

(1)

wherein

X, X', equal to or different from each other, are $-CF_2-$, $-CF_2CF_2-$;

a, b are as defined above; m, n, p, q are integers, zero comprised, such that m/n is between 0.1-10 when n is different from zero; (p+q)/(n+m+p+q) is between 0 and 0.05, (n+m+p+q) being different from 0;

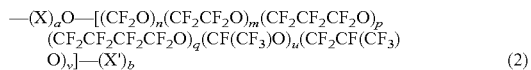

(2)

wherein

X, X', equal to or different from each other, are $-CF_2-$, $-CF(CF_3)-$, $-CF_2CF_2-$; and a, b are as defined above;

m, n, p, q, u, v are integers, including zero, such that (p+q)/(v+m) is between 0 and 0.05 when (v+m) is different from zero; the v/(n+m+u) ratio is lower than 50 when (n+m+u) is different from zero.

B derives from one or more homopolymerizable olefins by radical route, for example tetrafluoroethylene (TFE), ethylene (E), vinylidene fluoride (VDF), chlorotrifluoroethylene (CTFE), methyl methacrylate, vinyl acetate, optionally in the presence of non homopolymerizable olefins by radical route as hexafluoropropene (HFP), (per)fluorovinylethers, propylene, etc.

Block B' derives from one or more homopolymerizable or non homopolymerizable olefins by radical route. The olefins indicated for B can be used for obtaining the block B'. The preferred olefins of B' are the preferred olefins of B.

B and B' blocks containing units deriving from perfluorinated olefins are preferred. Examples of these olefins are TFE or TFE and HFP mixture. Other preferred B, B' blocks are those containing units deriving from at least one homopolymerizable perfluorinated olefin, for example TFE, and at least one non perfluorinated olefin, for example ethylene, VDF. Polymers (I) wherein z'=0 are still more preferred.

The total weight of the blocks B, B' is generally lower than 70% of the total weight of the polymer (I), preferably lower than 60%, more preferably lower than 40%.

In group B, when the substituents $R_1$-$R_8$ contain one or more functional groups they can be, for example OH, CN, $OCOR_a$, COX wherein $X=OR_a$, OH, $NR_a'R_a''$, halogen, wherein $R_a$, $R_a'$, $R_a''$ are $C_1$-$C_6$ alkyls.

Preferably j is an integer from 1 to 10 and j' is an integer from 0 to 9, with the proviso that (j+j') is higher than 2 and lower than 10.

The non functional end groups Q, Q' are preferably $-CF_3$, $-C_2F_5$, $-C_3F_7$, $-CF_2Cl$, $-C_2F_4Cl$.

In the functional end groups the bridging group D, D' is a bivalent or polyvalent, preferably trivalent, radical. Examples of bivalent D are groups of the linear aliphatic type $-(CH_2)_{m'}-$ wherein m' is an integer from 1 to 20, optionally containing heteroatoms. Examples of trivalent D can be (alkylen)cycloaliphatic, (alkylen)aromatic groups, optionally containing heteroatoms. D can be a linear or branched polyalkylenoxy chain, in particular containing repeating units of the $CH_2CH_2O$, $CH_2CH(CH_3)O$, $(CH_2)_3O$, $(CH_2)_4O$ type. In D the number of carbon atoms of the cycloaliphatic groups ranges from 3 to 20, preferably from 4 to 6, and that of the aromatic groups from 6 to 20, preferably from 6 a 12; the group D can optionally be formed also by combining among each other the aliphatic, cycloaliphatic and aromatic groups as defined above. The bridging group D, D' can contain amide, ester, ether, COO groups, sulphide, imine groups.

D, D' can be linked to the perfluoromethylene group of the perfluoropolyether chain by carbon bonds or $-O-$; $-CONR-$, wherein R has the following meanings: H, $C_1$-$C_{15}$ alkyl groups, $C_3$-$C_{15}$ cycloaliphatic or $C_5$-$C_{15}$ aromatic groups; $-C(O)O-$; $-COS-$; $-CO-$; heteroatom; or triazine, or heterocyclic aromatic groups having 5 or 6 atoms containing 2 or more heteroatoms, equal to or different from each other.

The groups $T_k$, $T'_k$ can be for example: $-SH$, $-SR'$, $-NR'_2$, $-NH_2$, $-NHR'$, $-SiR'_d L_{3-d}$, wherein L is an OR' group, d is an integer between 0 and 3, $-CN$, $-NCO$, $-CH=CH_2$,

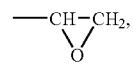

$-COR'$, $-OSO_2CF_3$, $-OCOCl$, $-OCN$, $-N(R')CN$,

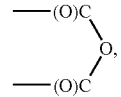

$-I$, $-CHO$, $-CH(OCH_3)_2$, $-SO_2Cl$, $-C(OCH_3)=NH$, $-C(NH_2)=NH$, $-CH(OH)CH_2OH$, $-CH(COOH)_2$, $-CH(COOR')_2$, $-CH(CH_2OH)_2$, $-CH(CH_2NH_2)_2$, $-CH(CN)_2$, $-CH(CH_2OCH_2CH=CH_2)_2$, $-C(OH)_2CF_3$, $-OH$, $-CH_2OH$; $-COY$ with $Y=OH$, $OR'$, $CF_3$, $NH_2$, $NHR'$, $NR'R''$, halogen; R', R'' being an alkyl, cycloaliphatic or aromatic group, R', R'' can optionally contain fluorine; $T_k$, $T'_k$ can also be an aryl radical formed of one or more aromatic rings, optionally condensed, for example triazine, pyridine, quinoline, benzothiazole, optionally substituted with one or more groups as for example alkyls, nitro; or an heterocyclic radical as for example phosphazene, dioxane.

The following groups are particularly preferred as $-D_q-T_k$, and $-D'_q-T'_k$:

$-C(O)OR_c$ for example with $R_c=-C_3H_7-C_4H_9$;

$-CH_2OH$;

$-CH_2O(CH_2CH_2O)_n H$ with n between 1 and 3;

$-C(OH)_2CF_3$;

$-CH_2OCH_2-CH(OH)-CH_2OH$;

$-CH_2NH_2$;

—$CH_2NHR'$;
—$CH_2NR'_2$;
—$C(O)NH_2$;
—$C(O)NHR'$;
—$CH_2$—O—Ar, wherein Ar is an aromatic group, optionally substituted, for example with a methylenedioxy group or an heterocyclic group for example of phosphazene, pyridine type, optionally substituted;
—$C(O)$—NH—$C_nH_{2n}$—$Si(OR')_3$ with n between 1 and 6.

The polymers of formula (I) generally comprise also mixtures of molecules containing only one functional end group Q, Q' (monofunctional), with molecules containing two end groups Q, Q' both functional (bifunctional). The molar ratios between monofunctional/bifunctional are between 99/1 and 1/99. The average functionality f of the mixture, meant as average number of functional end groups Q, Q' for molecule, can be determined for example by $^{19}$F-NMR and is in the range between 1 and 2, extremes included.

The polymers of formula (I) show low wear substantially constant even when the molecular weight increases and lower evaporation losses compared with the functionalized fluoropolyethers not containing B, B' blocks, the molecular weight being equal. See the examples. Therefore the polymers (I) can be used as functionalized lubricants having low wear in combination with low evaporation losses. Further, the lubricants of the invention have longer durability. The latter property is related to the presence of functional group in polymer (I) with respect to perfluoropolyethers not containing functionalized groups.

The alternated block polymers of formula (I) show the typical properties of perfluoropolyethers, as low Tg, but with higher molecular weights due to the presence of B', B. It has been furthermore unexpectedly and surprisingly observed that the Tg of the polymers (I) is not substantially affected by B, B'.

The Applicant has also surprisingly and unexpectedly found that the polymers of the present invention even having high molecular weights show low wear, generally lower than 1.1 mm even with high molecular weights. See the examples. This is unexpected and surprising since it is known that in polymers, in particular in perfluoropolyether polymers, the wear increases as the molecular weights increase.

The compounds of formula (I) are prepared by starting from compounds of formula (II)

$$Q_1\text{-O-}[A\text{-}B]_z\text{-}[A\text{-}B']_{z'}\text{-}A\text{-}Q_1' \quad (II)$$

wherein:
A is as defined above; B, B', z, z' are as defined above; $Q_1$, $Q_1'$, equal to or different from each other, are (per)fluoroalkyl non functional end groups —$CF_3$, —$C_2F_5$, —$C_3F_7$, —$CF_2Cl$, —$C_2F_4Cl$ or functional end groups —(CFW)—COY' wherein Y'=F, $CF_3$, OH, $OCH_3$, $OC_2H_5$ and W=F, $CF_3$, with the proviso that at least one of $Q_1$, $Q_1'$ is functional group, by using, for example, the reactants or the reaction conditions as described hereinafter. See in particular U.S. Pat. No. 3,810,874, herein incorporated by reference and the reactions of classic organic chemistry as described, for example, in "Organic functional group preparations", S. Sandler and W. Karo, Second Edition, New York, Academic Press, 1968-72.

| Terminal | $-D_q\text{-}T_k$ and/or $-D'_{q'}\text{-}T'_k$ | Reactant |
|---|---|---|
| 1 | —$CONHCH_2$—CH=$CH_2$ | $H_2NCH_2$—CH=$CH_2$ |
| 2 | —$CONH(CH_2)_3CO_2H$ | $H_2N(CH_2)_3CO_2H$ |
| 3 | —$CON(CH_3)CH_2CH_2OH$ | $HN(CH_3)CH_2CH_2OH$ |
| 4 | —$CONHCH_2CH_2NH_2$ | $H_2NCH_2CH_2NH_2$ |
| 5 | —$CONHCH_2CH_2SH$ | $H_2NCH_2CH_2SH$ |
| 6 | —$CONH(CH_2)_3Si(OCH_3)_3$ | $H_2N(CH_2)_3Si(OCH_3)_3$ |
| 7 | —CONH—C$_6$H$_4$—OH | HO—C$_6$H$_4$—NH$_2$ |
| 8 | —CONH—C$_6$H$_4$—$CH_2CO_2H$ | $H_2N$—C$_6$H$_4$—$CH_2CO_2H$ |
| 9 | —CONH—C$_6$H$_3$(OH)(OH) | HO—C$_6$H$_3$(OH)—$NH_2$ |
| 10 | —CONH—C$_6$H$_4$—$Si(CH_2)_2OC_2H_5$ | $H_2N$—C$_6$H$_4$—$Si(CH_2)_2OC_2H_5$ |
| 11 | —CONH—C$_6$H$_4$—$CH_2CH$=$CH_2$ | $H_2N$—C$_6$H$_4$—$CH_2CH$=$CH_2$ |

-continued

| Terminal | $-D_q\text{-}T_k$ and/or $-D'_q\text{-}T'_k$ | Reactant |
|---|---|---|
| 12 | —CONH—(2-methyl-5-amino-phenyl with NCO at position 3) | OCN—(2-methyl-phenyl with NCO) (tolylene diisocyanate) |
| 13 | —CONH—C$_6$H$_4$—O—C$_6$H$_4$—NCO | OCN—C$_6$H$_4$—O—C$_6$H$_4$—NCO |
| 14 | —CONH—C$_6$H$_4$—CH$_2$—C$_6$H$_4$—NCO | OCN—C$_6$H$_4$—CH$_2$—C$_6$H$_4$—NCO |
| 15 | 2-methyl-benzoxazol-5-ol | (1) 2-amino-1,4-dihydroxybenzene<br>(2) Heating |
| 16 | 2-methyl-5-(3,4-diaminophenyl)-1H-benzimidazole | (1) 3,3',4,4'-tetraaminobiphenyl<br>(2) Heating |
| 17 | 2-methyl-benzothiazole-6-carboxylic acid | (1) 4-amino-3-mercaptobenzoic acid<br>(2) Heating |
| 18 | 2-(1-methylvinyl)-1,3,4-oxadiazole | (1) H$_2$NNHCOC(CH$_3$)=CH$_2$<br>(2) Dehydration |
| 19 | —CO$_2$CH$_2$C(CH$_3$)$_2$CH$_2$OH | HOCH$_2$C(CH$_3$)$_2$CH$_2$OH |
| 20 | —CO$_2$CH$_2$CH(OH)CH$_3$ | CH$_3$CH—CH$_2$ (propylene oxide) |
| 21 | —CO$_2$CH$_2$CH=CH$_2$ | CH$_2$=CHCH$_2$OH |
| 22 | —CN | (1) NH$_3$<br>(2) Dehydration |
| 23 | 2-methyl-4-vinyl-6-(trifluoromethyl)-1,3,5-triazine | (1) NH$_3$<br>(2) Dehydration<br>(3) H$_2$N—C(=NH)—CF$_3$<br>(4) (CH$_2$=CHCO)$_2$O |
| 24 | 5-methyl-1H-tetrazole | Compound 22 + NH$_3$ |

-continued

| Terminal | $-D_q-T_k$ and/or $-D'_q-T'_k$ | Reactant |
|---|---|---|
| 25 | 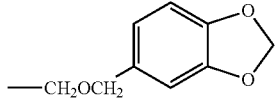 —CH₂OCH₂— | (1) LiAlH₄<br>(2) 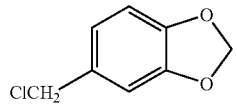 ClCH₂— |
| 26 | —CH₂OCH₂CH—CH₂ (epoxide) | (1) LiAlH₄<br>(2) Epibromohydrin |
| 27 | —CH₂—O—CH₂CH=CH₂ | (1) LiAlH₄<br>(2) CH₂=CHCH₂Br |
| 28 | 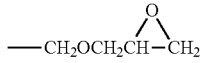 —CH₂OCO— (with NH₂) | (1) LiAlH₄<br>(2) 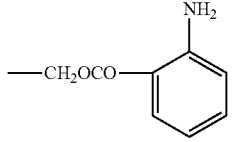 |
| 29 | —CH₂OSO₂F | (1) LiAlH₄<br>(2) CF₃SO₂F + (C₂H₅)₃N |
| 30 | —CH₂OCN | (1) LiAlH₄<br>(2) NCCl + (C₂H₅)₃N |
| 31 | 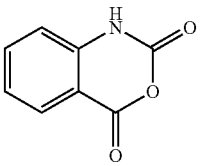 —CH₂O—⟨⟩—NH₂ | (1) Compound 29 +<br>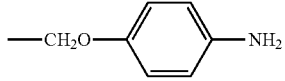 NaO—⟨⟩—NO₂<br>(2) H₂ |
| 32 | —CH₂O—⟨⟩—NCO | Compound 31 + phosgene |
| 33 |  —CH₂O— (phthalic anhydride) | (1) Compound 29 +<br>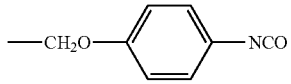 NaO—⟨⟩—CO₂H₃, CO₂H₃<br>(2) Hydrolysis<br>(3) Acetic Anhydride |
| 34 | —CH₂O—⟨⟩—O—⟨⟩—NCO | (1) Compound 29 +<br>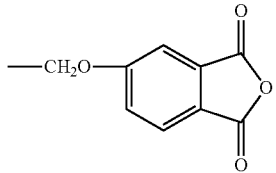 NaO—⟨⟩—O—⟨⟩—OH<br>(2) ClCN + triethylamine |
| 35 | —C(NH₂)=NH | Compound 22 + NH₃ |
| 36 | —CH₂NCO | (1) Compound 29 + NH₃<br>(2) COCl₂ |
| 37 | —CH₂NHCH₃ | Compound 29 + CH₃NH₂ |
| 38 | 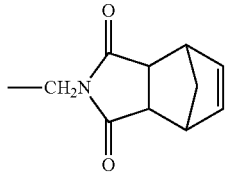 —CH₂N (bicyclic imide) | (1) Compound 29 + NH₃<br>(2) 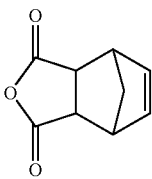 (bicyclic anhydride) |

-continued

| Terminal | $-D_q-T_k$ and/or $-D'_q-T'_k$ | Reactant |
|---|---|---|
| 39 | —CH₂N(imide-norbornane-Si(CH₃)₂OCOCH₃) | (1) Compound 38 + Hsi(CH₃)₂OCOCH₃ + H₂PtCl₆ |
| 40 | —CH₂OCOC(CH₃)=CH₂ | (1) LiAlH₄ (2) CH₂=C(CH₃)COCl |
| 41 | —CH₂I | Compound 29 + NaI |
| 42 | —CH₂SH | (1) Compound 29 + CH₃COSNa (2) Hydrolysis |
| 43 | —CH₃N⁺≡C⁻ | (1) Compound 29 + NH₃ (2) HCO₂CH₃ (3) COCl₂ + (C₂H₅)₃N |
| 44 | —NCO | (1) NaN₂ (2) Heating |
| 45 | —COC₆H₅ | Cd(C₆H₅)₂ |
| 46 | —C(CH₃)₂OH | (1) CH₂MgBr (2) H⁺ |
| 47 | —CHO | LiAlH₄ |
| 48 | —C(CH₃)=CH₂ | Compound 46 + P₂O₅ |
| 49 | —CH₂N(CN)CH₃ | Compound 37 + ClCN + (C₂H₅)₃N |
| 50 | —I | (1) Ag₂O (2) I₂ |
| 51 | —CH=CH₂ | Compound 47 + CH₂=P(C₆H₅)₃ |
| 52 | —C(OCH₃)=NH | Compound 22 + CH₂OH + (C₂H₅)₃N |
| 53 | —CH₂SO₂Cl | Compound 42 + Cl₂ + H₂O |
| 54 | —CH(OCH₃)₂ | Compound 47 + CH₃OH + acid |
| 55 | —CH₂O—C₆H₄—O—C₆H₅ | Compound 29 + NaO—C₆H₄—O—C₆H₅ |
| 56 | —CH₂O—C₆H₄—O—C₆H₄—SO₂Cl | Compound 55 + ClSO₃H |
| 57 | —CH₂OH | LiAlH₄ |
| 58 | —CH₂O(CH₂CH₂O)ₙH | compound (57) + n (ethylene oxide) |
| 59 | —CH₂O-(phenanthroline with R'₂) | compound (57) + Cl-(phenanthroline with R'₂) |
| 60 | —CH₂O-(bipyridine with R'₂) | compound (57) + Cl-(bipyridine with R'₂) |

| Terminal | $-D_q-T_k$ and/or $-D'_q-T'_k$ | Reactant |
|---|---|---|
| 61 | —CH₂O— attached to 4-R'₁-pyridin-2-yl linked to 3-R'₁-pyridin-2-yl (bipyridine) | compound (57) + Cl— attached to 4-R'₁-pyridin-2-yl linked to 3-R'₁-pyridin-2-yl |
| 62 | —CH₂O— substituted quinoline with $B_1$-E and $R'_2$ substituents | compound (57) + Cl— substituted quinoline with $B_1$-E and $R'_2$ substituents |
| 63 | —CH₂O— substituted anthraquinone with $B_1$E | compound (57) + Cl— substituted anthraquinone with $B_1$-E |
| 64 | —CH₂O— substituted benzoxazole with $B_1$ | compound (57) + Cl— substituted benzoxazole with $B_1$ |
| 65 | —CH₂O— substituted triazine with two $B_1$-E groups | compound (57) + Cl— substituted triazine with two $B_1$-E groups |
| 66 | —CH₂O— substituted pyrimidine with two $R'_1$ groups | compound (57) + Cl— substituted pyrimidine with two $R'_1$ groups |
| 67 | —CH₂O— substituted cyclohexane with two $B_1$ and $R'_1$ | compound (57) + Cl— substituted cyclohexane with two $B_1$ and $R'_1$ |
| 68 | —CH₂O— substituted cyclohexane with $B_1$ and $R'_1$ | compound (57) + Cl— substituted cyclohexane with $B_1$ and $R'_1$ |
| 69 | —CH₂O— substituted benzene with four $R'_1$ groups | compound (57) + Cl— substituted benzene with four $R'_1$ groups |

-continued

| Terminal | $-D_q-T_k$ and/or $-D'_q-T'_k$ | Reactant |
|---|---|---|
| 70 | —CH₂O—[naphthalene with R'₁ substituents] | compound (57) + Cl—[naphthalene with R'₁ substituents] |
| 71 | —CH₂O—[anthracene with R'₁ substituents] | compound (57) + Cl—[anthracene with R'₁ substituents] |
| 72 | —CH₂O—[partially hydrogenated anthracene with H and R'₁ substituents] | compound (57) + Cl—[partially hydrogenated anthracene with H and R'₁ substituents] |
| 73 | —CH₂O—[tetrahydronaphthalene with H and R'₁] | compound (57) + Cl—[tetrahydronaphthalene with H and R'₁] |
| 74 | —CH₂O—CH₂—CH(OH)—CH₂OH | compound (57) + CH₂—CH—CH₂OH (epoxide, glycidol) | wherein:
E=$C_1$-$C_3$ alkyl;
R'$_1$=H or $C_1$-$C_3$ alkyl;
B$_1$=oxygen or sulphur;
R'$_2$=Cl, Br, H, $C_1$-$C_3$ alkoxy;

Preferably, molar ratio between the functional end groups and the non functional end groups in the polymers (II) is higher than 1.

More particularly, the compounds of formula (I) with terminal —CH₂OH can be prepared, for example, by reduction of the corresponding esters with reducing agents, as for example lithium aluminum hydride or sodium borohydride, in aprotic polar solvents by following the teaching of U.S. Pat. No. 6,509,509. Alternatively they can be prepared by catalytic reduction of the corresponding carboxylic acids with hydrogen, according to patent application US 2004/0230080.

The compounds of formula (I) having more than one end alcoholic functionality can be prepared, for example, by reaction of the end group —CH₂OH with glycidol by following the publication of Tonelli, Gavezzotti, Strepparola, J. Fluorine Chem., 95 (1999)-51-70.

The polymers of formula (I) with —CH₂OH can be used in nucleophilic reactions with haloalkanes or with chlorobenzyl or chloronaphthyl derivatives, for obtaining aromatic terminal ends according to the publication of Tonelli, Gavezzotti, Strepparola, J. Fluorine Chem., 95 (1999)-51-70, and to U.S. Pat. No. 4,757,145 and U.S. Pat. No. 4,721,795 herein incorporated by reference.

The polymers (II) are prepared starting from peroxidic perfluoropolyethers with a process comprising the following steps:
(a) reaction of a peroxidic perfluoropolyether comprising at least one or more of the following units:
($CF_2O$), ($CF_2CF_2O$), ($CF_2CF_2CF_2O$), ($CF_2CF_2CF_2CF_2O$), ($CF(CF_3)O$), ($CF(CF_3)CF_2O$), ($CF_2CF(CF_3)O$), having a peroxidic content (PO) defined as g of active oxygen (molecular weight=16) in 100 g of perfluoropolyether peroxide, between 0.1 and 4, preferably between 0.1 and 3.5, with at least one homopolymerizable olefin by radical route, optionally in the presence of one or more non homopolymerizable olefins, at temperatures between 125° C. and 280° C. and at a pressure between 1 bar and 50 absolute bar, by feeding the olefin until obtaining a reaction mixture having a predetermined PO, wherein the ratio between the total moles of the olefin(s) and the moles of peroxidic units (moles of —O—O— bonds) of the perfluoropolyether ranges between 1 and 100;

(b) interruption of the olefin feeding and treatment of the polymer obtained in (a) until removal of the peroxidic content obtaining polymers of formula (II).

The polymer of formula (II) is obtained through a polymerization process which brings to a polymeric mixture wherein the polymeric chains have different values of j and j'. The average value of (j+j') of the polymeric mixture can also be a fractional number.

In step (a) optionally more homopolymerizable olefins by radical route can be used.

The ratio between the total moles of the fed olefins and the moles of peroxidic units (moles of —O—O— bonds) contained in the peroxidic perfluoropolyether is preferably between 1 and 50, more preferably between 1 and 25.

The temperature in step (a) is preferably between 180° C. and 230° C. The pressure in step (a) is preferably between 1 and 10 absolute bar.

Step (a) can optionally be carried out in the presence of a fluorinated solvent. The amount of the latter is such as to have a peroxidic perfluoropolyether content between 1% and 50% by weight with respect to the total weight of the solvent plus peroxidic perfluoropolyethers, preferably between 5%-30% by weight. Preferably the solvent solubilizes the peroxidic perfluoropolyether at the reaction temperature of step a) and is not reactive towards the radical species formed in the reaction of step (a), as for example (per)fluoroalkyl or perfluorooxyalkyl radicals. Preferably the solvent is selected from perfluorocarbons, hydrofluorocarbons, perfluoropolyethers and hydrofluoropolyethers, more preferably perfluoropolyethers, such as Galden®, and hydrofluoropolyethers such as H-Galden®. When a solvent is used in step a) the starting peroxidic perfluoropolyether can have an active oxygen (PO) content even up to 5.

The starting peroxidic perfluoropolyether can only contain units selected from (CF(CF$_3$)O), (CF(CF$_3$)CF$_2$O), (CF$_2$CF(CF$_3$)O), (CF$_2$O). In general the end groups of the peroxidic perfluoropolyether are C$_1$-C$_3$ (per)fluoroalkyls, optionally containing one or more chlorine atoms, preferably one Cl atom, or functional end groups as acyl fluorides, fluoroformates and ketones.

The peroxidic perfluoropolyether more preferably is selected from the following classes:

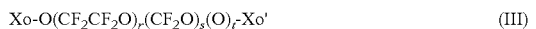

(III)

wherein

Xo and Xo', equal to or different from each other, are —CF$_2$Cl, —CF$_2$CF$_2$Cl, —CF$_3$, —CF$_2$CF$_3$, —CF$_2$COF, —COF;

r, s and t are integers such that the number average molecular weight is generally between 400 and 150,000, preferably 500-80,000; r/s is between 0.1 and 10, s being different from zero; t is an integer such that the PO is in the above defined range.

The peroxidic perfluoropolyethers of formula (III) can be prepared by tetrafluoroethylene oxypolymerization by following the teachings of U.S. Pat. No. 3,715,378, U.S. Pat. No. 4,451,646, U.S. Pat. No. 5,258,110, U.S. Pat. No. 5,744,651;

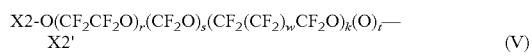

(IV)

wherein

X1 and X1', equal to or different from each other, are —CF$_2$Cl, —CF$_2$CF$_2$Cl, —CF$_2$CF$_3$, —CF$_3$, —C$_3$F$_7$, —CF(CF$_3$)COF, —COF;

r, s, t, u, v are integers such that the number average molecular weight is in the range 500-150,000, preferably 700-80,000; r can also be zero; v/(r+s+u) is lower than 100, preferably lower than 50, and t is a number such that the PO is within the above defined range.

The peroxidic perfluoropolyethers of formula (IV) can be prepared by oxypolymerization of the perfluoropropene alone or in admixture with tetrafluoroethylene and by following the teachings of U.S. Pat. No. 5,000,830 and U.S. Pat. No. 3,593,530;

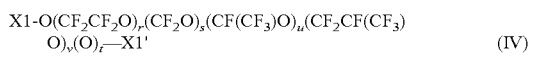

(V)

wherein

X2 and X2', equal to or different from each other, are —CF$_2$COF, —COF;

w=1 or 2;

r, s and t, k are integers such that the number average molecular weight is in the range 700-100,000, preferably 700-80,000; r/s is between 0.2 and 10, k/(r+s) is lower than 0.05; t is an integer such that the PO is as defined above. The peroxidic perfluoropolyethers of formula (V) can be obtained according to the teachings of the patent application US 2005/0192413.

The peroxidic perfluoropolyethers can be subjected, before step (a), to a partial reduction of the amount of peroxidic bonds by chemical reduction, preferably with hydrogen in the presence of catalysts, such as Pd, Pt, Ru, by following the teachings reported in U.S. Pat. No. 4,451,646, U.S. Pat. No. 3,847,978, herein incorporated by reference, or by thermal treatment according to U.S. Pat. No. 3,715,378, herein incorporated by reference. The thermal treatment can be carried out for example at temperatures between 100° C. and 250° C. Alternatively to the thermal treatment a photochemical treatment can be carried out by using UV light, at a temperature between −100° C. and +100° C., optionally in the presence of an inert solvent as for example an halogenated solvent.

In step (a) the ratio used between the olefins and the peroxide units (PO) is a function of the percentage of olefinic units in the final polymer of formula (I). Generally the ratio depends also on the olefin solubility in the reaction mixture, the temperature, the pressure, the olefin reactivity and the presence of other olefins. When very reactive olefins are used, the molar ratios between the olefins and the peroxidic units is preferably lower than 50, more preferably lower than 25. The same takes place when temperature and pressure conditions are such to have a high concentration of olefin in liquid phase.

Step (a) can be carried out under batch-, semibatch- or continuous-conditions.

In the batch process the peroxidic PFPE and the olefins are fed into the reactor before the reaction starts.

In the semibatch process the peroxidic PFPE is fed into the reactor before the reaction starts while the olefin, or the mixture of olefins, is continuously fed during the reaction. Also the inverse process can be used.

In the continuous process the peroxide and the olefins are continuously fed and the reaction mixture is withdrawn from the reactor.

The feeding of the olefin in the continuous or semibatch processes can be carried out with a flow-rate constant or not, with the condition that the ratio between the olefin and the peroxidic units (moles of —O—O— bonds) be in the above range.

When a semibatch or batch is used, it is preferable to carry out the reaction by using a temperature gradient, for example starting from a predetermined temperature, for example 180° C., reaching 230° C. The time to reach the highest temperature of the gradient is generally of 3 to 8 hours.

When more olefins are used in step (a), it is possible to feed them in a sequent way or not. In this case, the polymers of formula (II) contain the blocks B'.

In step (a) the PO is determined according to the method reported below.

Step (a) can be carried out in the presence of UV radiations, having the wavelength preferably between 200 and 350 nm, at temperatures generally between −100° C. and +100° C., preferably −80° C. and +80° C., more preferably between −60° C. and +60° C. In this embodiment the ratio between the olefin moles and the moles of peroxidic units of the peroxide (moles of —O—O— bonds) is preferably between 1 and 75. A solvent transparent to UV radiations is preferably used in this embodiments. Examples of solvents are those listed under step (a), provided that they are transparent at UV radiations. The pressure is preferably lower than 5 absolute bar by using a batch or semibatch process.

Step (b) is carried out to completely remove the peroxidic content of the polymer obtained in step (a). Complete removal of the peroxidic content means that peroxide content is under the analytical limit by using the PO determination method indicated in the characterization in the Examples. Step (b) can be carried out by chemical reduction with a reducing agent until the complete removal of the residual peroxidic content, for example by using a reducing agent as hydrogen, optionally in the presence of catalyst as Pd, Pt, Ru; primary or secondary alcohols as methanol, ethanol, isopropanol, simple hydrides as LiH, KH, AlH$_3$, or complex hydrides as LiAlH$_4$, NaBH$_4$, or SO$_2$, HI, alkaline metal salts at temperatures between −30° C. and 250° C., optionally in the presence of a solvent. See for example U.S. Pat. No. 4,451,646 and U.S. Pat. No. 3,847,978 herein incorporated by reference.

Depending on the chemical reduction process, polymers (II) are obtained with the various end groups. For example the catalytic hydrogenation brings to the formation of —COF end groups; the reduction with SO$_2$/I in the presence of alcohol allows the formation of ester end groups.

The end groups of the compounds of formula (II) are chosen in view of the terminal group desired for terminal end of formula (I): for example, when polymers of formula (I) have —CH$_2$OH end groups, it is suitable to use a precursor polymer (II) having ester end groups, preferably —COF end groups and by using the step indicated above.

The step (b) leads to the formation of two functional end groups for each reduced peroxidic bond. Therefore the higher the PO of the product obtained in step (a), the higher the functionality (or average functionality) of the polymer (II). This means that the PO value of the mixture obtained in step (a) determines the functionality f of the polymer (II).

Alternatively step (b) can be carried out by photochemical- or thermal-route. The latter is preferred and is carried out, for example, by heating the mixture obtained in step (a) at temperatures from 200° C. to 280° C., preferably 220-250° C., until the disappearance of the peroxide content. See for example U.S. Pat. No. 3,715,378, EP 1,454,938, EP 1,568,730, herein incorporated by reference. When step (b) is carried out by photochemical route in the presence of UV radiations, the temperature of the treatment is between −100° C. and +100° C., as a preferred range.

If as starting peroxide a perfluoropolyether of the class (III) and (IV) is used, it is preferable to carry out step (b) by chemical reduction if a high functionality is desired. The use of peroxidic perfluoropolyethers of class (V) leads to polymers of formula (II) having functionality 2.0 independently of the type of step (b) used.

An optional solvent removal step (b') can be carried out when a solvent is used in step (a). Step (b') can be carried out, for example, by distillation under vacuum.

As said, the polymers (I) obtainable from the polymers (II) can be used as lubricants having low wear values.

A further object of the present invention is the use of polymers of formula (I) as lubricants having low wear values, in particular for applications where an homogeneous film is required on surfaces, as preferably metallic, glass, ceramic or polymeric surfaces.

The products of formula (I) of the invention can be used also in admixture with polymers having formula of structure (I) but with both non functional end groups, as for example —CF$_3$, —C$_2$F$_5$, —C$_3$F$_7$, —CF$_2$H, —CF$_2$CF$_2$H, —CFHCF$_3$, —CF$_2$Cl, —C$_2$F$_4$Cl, CH$_3$, C$_2$H$_5$, C$_3$H$_7$.

It has furthermore surprisingly and unexpectedly been found that the polymers (I) of the present invention, when used as additives of fluorinated lubricants, to reduce the wear, the friction coefficient and by maintaining the properties for long times. The fluorinated lubricants can be liquid or solid, for example greases.

Furthermore, it has been found surprisingly and unexpectedly that also the precursor of formula (II) having at least one functional end group —(CFW)—COY', wherein Y'=CF$_3$, OH, OCH$_3$, OC$_2$H$_5$ and W=F, CF$_3$, can be used as additives as they reduce the wear and the friction coefficient. These additives can be used in admixture with additives of formula (I).

A further object of the present invention are lubricating compositions comprising the polymers (I) and/or the polymers (II) having at least one functional end group —(CFW)—COY', wherein Y'=CF$_3$, OH, OCH$_3$, OC$_2$H$_5$ and W=F, CF$_3$, and fluorinated lubricants, preferably oils.

Preferably the fluorinated oil is a perfluoropolyether oil containing one or more of the following repeating units: —CFXO—, wherein X is equal to F or CF$_3$; —CF$_2$CF$_2$O—, —(C$_3$F$_6$O)—, —CF$_2$CF$_2$CF$_2$O—, —CF$_2$CF$_2$CF$_2$CF$_2$O—, said units being statistically distributed along the chain.

The amount of polymers (I) in the composition is between 0.1% and 50% by weight, preferably between 0.5% and 30%, more preferably 1%-10%. Mixture of (I) and (II) can also be used.

The perfluoropolyether oils generally have viscosities between 10 and 4,000 cSt at 20° C., preferably between 30 and 2,000 cSt, and are preferably selected from the following classes:

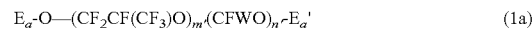

$$E_a\text{-O---}(CF_2CF(CF_3)O)_{m'}(CFWO)_{n'}\text{-}E_a' \quad (1a)$$

wherein

W is equal to F or CF$_3$;

Ea and Ea', equal to or different from each other, are selected from CF$_3$, C$_2$F$_5$ or C$_3$F$_7$, one fluorine atom of one or of both the end groups can be substituted by Cl and/or H;

m' and n' are integers such that the m'/n' ratio is between 20 and 1,000, n' being different from zero; the various units are statistically distributed along the chain, the product viscosity being as defined above.

These products can be obtained by perfluoropropene photooxidation, as described in GB 1,104,482, and by successive conversion of the end groups, as described in GB 1,226,566;

$$C_3F_7O(CF(CF_3)CF_2O)_{o'}\text{-}Da \quad (2a)$$

wherein

Da is equal to —$C_2F_5$ or —$C_3F_7$, one fluorine atom of one or of both the end groups can be substituted by Cl and/or H;

o' is an integer such that the product viscosity is as defined above.

These products can be prepared by ionic oligomerization of the perfluoropropyleneoxide and subsequent treatment with fluorine, as described in U.S. Pat. No. 3,242, 218;

$$\{C_3F_7O—(CF(CF_3)CF_2O)_p—CF(CF_3)—\}_2 \quad (3a)$$

wherein p' is an integer such that the product viscosity is as defined above, one F atom of one or both the $C_3F_7$ end groups can be substituted by Cl and/or H.

These products can be obtained by ionic telomerization of the perfluoropropyleneoxide and subsequent photochemical dimerization, as reported in U.S. Pat. No. 3,214,478;

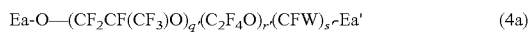
$$Ea-O—(CF_2CF(CF_3)O)_q—(C_2F_4O)_r—(CFW)_s-Ea' \quad (4a)$$

wherein

W is equal to F or $CF_3$;

Ea and Ea', equal to or different from each other, are as defined above;

q', r' and s' are integers and can also have the value of 0, and such that the product viscosity is as defined above.

These products are obtainable by photooxidation of a mixture of $C_3F_6$ and $C_2F_4$ and subsequent treatment with fluorine, as described in U.S. Pat. No. 3,665,041;

$$Ea-O—(C_2F_4O)_{t'}(CF_2O)_{u'}-Ea' \quad (5a)$$

wherein

Ea and Ea', equal to or different from each other, are as defined above;

t' and u' are integers such that the t'/u' ratio is between 0.1 and 5 and the product viscosity is as defined above.

These products are obtained by photooxidation of $C_2F_4$, as reported in U.S. Pat. No. 3,715,378, and subsequent treatment with fluorine, as described in U.S. Pat. No. 3,665,041;

$$Ea-O—(CF_2CF_2CF_2O)_{v'}-Ea' \quad (6a)$$

wherein

Ea and Ea', equal to or different from each other, are as defined above;

v' is a number such that the product viscosity is as defined above.

These products are obtained as described in EP 148,482;

$$Da-O—(CF_2CF_2O)_{z'}-Da' \quad (7a)$$

wherein

Da and Da', equal to or different from each other, are selected between $C_2F_5$ or $C_3F_7$, one fluorine atom of one or of both the end groups can be substituted by Cl and/or H;

z' is an integer such that the product viscosity is as defined above.

These products can be obtained as reported in U.S. Pat. No. 4,523,039;

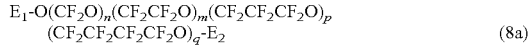
$$E_1-O(CF_2O)_n(CF_2CF_2O)_m(CF_2CF_2CF_2O)_p(CF_2CF_2CF_2CF_2O)_q-E_2 \quad (8a)$$

wherein $E_1$ and $E_2$ are perfluoroalkyl end groups equal to or different from each other, having formula —$(CF_2)_zCF_3$ wherein z is an integer from 0 to 3;

n, m, p, q are integers equal to or different from each other comprised between 0 and 100 and selected so that the oil viscosity is as defined above and such that the m/n ratio is between 2 and 20; (p+q)/(n+m+p+q) is between 0.05 and 0.2; n/(n+m+p+q) is between 0.05 and 0.40, (n+m+p+q) being different from 0. These products can be obtained according to what described in EP 1,454,938.

Classes (1a), (4a), (5a), (8a) or their mixtures are preferred, classes (5a) and (8a) or their mixtures are more preferred.

The lubricating compositions of the present invention can be in solid form, for example greases, or in liquid form and can be used to treat surfaces of natural or artificial substrata; paper, cotton, wood, stony materials, polymeric materials, metallic or inorganic substrata can be mentioned.

The polymers of formula (I) are applied to the surface preferably by dissolving or dispersing them in (per)fluorinated solvents, for example perfluoropolyethers as Galden® of general formula $CF_3O—(CF_2C(CF_3)O)_m(CF_2O)_n—CF_3$, for example Galden HT55 (Bp=about 55° C.); perfluoroalkanes as perfluorooctane, perfluorohexane; hydrofluoroalkanes as $C_5H_2F_{10}$ (Vertrel); (per)fluorocycloalkanes as cyclo-$C_5H_3F_7$ (Zeorora-H®); hydrofluoroethers as methoxy-nonafluorobutane (HFE-7100), ethoxy-nonafluorobutane (HFE-7200), 2-trifluoromethyl-3-ethoxydecafluorohexane (HFE-7500); hydrofluoropolyethers, for example H-Galden® of general formula $CF_2H—(CF_2CF_2O)_m(CF_2O)_n—CF_2H$, as H-Galden ZV60 (Bp=about 60° C.), H-Galden ZT130 (Bp=about 130° C.), H-Galden ZT180 (Bp=about 180° C.). When the polymers (I) contain the segments B, B' deriving from hydrogenated olefinic monomers, also non fluorinated solvents as acetone, dimethylacetamide, can be used.

The concentration of the polymers of formula (I) in the solvents is between 0.1% and 30% by weight, preferably 0.5%-10%, still more preferably 1%-5%. The obtained compositions can be applied on the surfaces to be lubricated for obtaining a lubricating film, preferably homogeneous. The solvent is eliminated from the surface preferably by evaporation. The compositions polymer/solvent are applied by known techniques, as dip-coating, spray-coating, casting, spin-coating, etc. In this way a homogeneous lubricating thin film is obtained. The compositions can be applied also to irregular surfaces, for example microgears, electric contacts, etc.

The polymers of formula (I) and (II) can also be used as macromers in polycondensation or polyaddition reactions for preparing polymers having improved properties at low temperatures, in particular an improved elastic behaviour at low temperatures. In particular in the polycondensation reactions polymers (I), (II) having functionality higher than 1.95, preferably 1.99, more preferably 2, are used.

The following examples illustrate with non limitative purposes the present invention.

EXAMPLES

Characterization

NMR

The NMR spectra have been recorded by using a Variant Mercury 200 MHz spectrometer by using $CFCl_3$ as internal reference for the $^{19}F$-NMR analyses and tetramethylsilane (TMS) as reference for the $^1H$-NMR analyses. Hexafluorobenzene is also used as solvent for the sample. The NMR measurement allows to determine the number average length of the olefinic block B, B', the z, z' indexes and the number average molecular weight of the compound of formula (I).

Determination Peroxidic Content (PO)

The analysis of the peroxide content has been carried out by iodometric titration, according to the following method. A weighed amount of sample (some grams) is dissolved in about 20 ml of Galden® ZT130. 1 ml of glacial acetic acid and 30 ml of a sodium iodide solution at 5% w/w in isopropylic alcohol are added. The resulting suspension is left under stirring for 15 minutes and the iodine developed from the reaction with the peroxide is titered with an aqueous solution of sodium thiosulphate having a known titre, by using the Mettler® DL 40 device for the potentiometric titration, equipped with platinum electrode and reference electrode. The sensitivity limit for the PO determination is 0.0002.

Calculation of the Functionality f of the Polymer (I)

On the basis of the results of the $^{19}$F-NMR analysis the functionality f is calculated by the following ratio:

$$f = 2 \times \frac{\text{amount (molar) of functional end groups}}{\text{amount (molar) of total end groups}}$$

DSC

The thermal transitions have been determined with the Perkin Elmer® DSC-2C instrument by using the following procedure: cooling from 20° C. to −170° C. at 80° C. min$^{-1}$ and heating at 20° C. min$^{-1}$ from −170° C. to 350° C. under nitrogen flow.

Four-Ball Wear Test

For the wear evaluation of the compositions the ASTM D 2266 and D 4172 standards have been followed by using a load of 40 kg$_f$ at a test temperature of 75° C. for a duration of one hour.

Loss by Weight at the Evaporation

The test is carried out according to the ASTM 2595 standard for 22 hours at 149° C.

Determination of the Friction Coefficient by SRV

It has been evaluated by means of the SRV equipment by Optimol GmbH under oscillatory conditions and by using as configuration the ball on disc under the following operating conditions:

| | |
|---|---|
| applied load | 100N |
| oscillation amplitude | 1 mm |
| oscillation frequency | 50 Hz |
| temperature | 50° C. |
| test duration | 2 hours |

The friction coefficient has been evaluated as an average of the values obtained during two hours eliminating the first 200 sec.

Example 1

In a 1 litre glass flask, equipped with sonde for the temperature, mechanical stirring, bubbling inlet for the nitrogen and/or tetrafluoroethylene (TFE) adduction, 600 g of Galden® HT230 and 300 g of a peroxidic perfluoropolyether of formula:

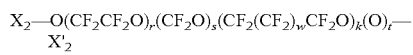

are introduced, with r/s=1.20, w=1 or 2, k/(s+r)=0.035 and t/(s+r+k)=0.20, with $X_2$ and $X'_2$ equal to —CF$_2$COF and having number average molecular weight equal to 2.3·10$^3$ and PO=3.2.

The reaction mixture is heated under stirring and under nitrogen flow (2 NI h$^{-1}$) up to 190° C., temperature at which the nitrogen feeding is closed and that of TFE (10 NI h$^{-1}$) opens. The mixture is maintained under stirring at 190° C. for 1.5 hours, then brought to 200° C. and maintained at this temperature for 1.5 hours and lastly, increased to 210° C. and maintained at this temperature for 1.0 hour.

The TFE feeding is interrupted, that of nitrogen opens (2 NI h$^{-1}$) and the reaction mixture is further heated up to 230° C. and for 4 hours.

The ratio between the total TFE moles fed and the moles of peroxidic units is equal to 3.3.

One proceeds then to the distillation under vacuum (10$^{-1}$ mbar) of the solvent of Galden® HT230 (kier Tmax=240° C.) obtaining 280 g of product of formula (II).

One proceeds then to the conversion of the end groups of the product (II) into ester end groups, as hereinafter described, since the latter groups are easily preparable from the polymers (II) by means of an only esterification step. It is understood that the end groups of the product (II) can be transformed into other functional end groups.

An aliquot of 50 g is then drawn which is dissolved in 200 g of H-Galden® ZT130 and added, dropwise to 200 g of isobutanol cooled with water ice. At the end of the addition it is left under stirring for one hour, then it is heated to the reflux temperature for 2 hours. One proceeds then to the distillation of H-Galden® ZT130 and of the isobutanol in excess, first at atmospheric pressure, then under vacuum (10$^{-1}$ mbar). 52 g of product having the following structure are recovered:

wherein $T_k$ and $T'_k$ are —OCH$_2$CH(CH$_3$)$_2$;
B=—(CF$_2$CF$_2$)$_j$— with j having a number average value equal to 3.8 wherefore the number average length of the segment B is equal to 7.9 carbon atoms;
A=-CF$_2$—O[(CF$_2$O)$_m$(CF$_2$CF$_2$O)$_n$(CF$_2$CF$_2$CF$_2$O)$_p$ (CF$_2$CF$_2$CF$_2$CF$_2$O)$_q$](CF$_2$)$_b$— wherein m/n=1.24, p/n=0.013 and q/n=0.022 and (p+q)/(n+m+p+q)=0.015, wherein b=0 when A is linked to —CF$_2$C(O)-T'$_k$, while b=1 in all the other cases;
z=2.2.

The number average molecular weight of the polymer of formula (I) is equal to 2.2·10$^3$ and the percentage by weight of blocks B in the polymer of formula (I) is 38%.

Example 2

The Example 1 is repeated by using the following peroxide:

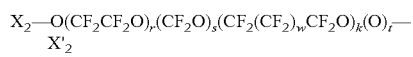

with r/s=1.26, w=1 or 2, k/(s+r)=0.035 and t/(s+r+k)=0.064 and with $X_2$ and $X'_2$ equal to —CF$_2$COF, with number average molecular weight equal to 3.1·10$^4$ and PO=1.05.

The reaction mixture is heated under stirring and under nitrogen flow (1 NI h$^{-1}$) up to 190° C., temperature at which the nitrogen feeding is closed and that of TFE (3.3 NI h$^{-1}$) opens. The mixture is maintained under stirring at 190° C. for 1.5 hours, then brought to 200° C. and maintained at this temperature for 1.5 hours and lastly, increased to 210° C. and maintained at this temperature for 1.0 hours.

The TFE feeding is interrupted, that of nitrogen opens (2 NI h$^{-1}$) and the reaction mixture is further heated up to 230° C. and for 4 hours.

The ratio between the total TFE moles fed and the moles of peroxidic units is equal to 3.3.

One proceeds then to the distillation under vacuum (10$^{-1}$ mbar) of the solvent of Galden® HT230 (kier Tmax=240° C.) obtaining 291 g of product.

An aliquot of 50 g is drawn which is dissolved in 200 g of H-Galden® ZT130 and added, dropwise, to 100 g of isobutanol cooled with water ice. At the end of the addition it is left under stirring for one hour, then it is heated to the reflux temperature for 2 hours. One proceeds then to the distillation of H-Galden® ZT130 and of the isobutanol in excess, first at atmospheric pressure, then under vacuum ($10^{-1}$ mbar). 50 g of product having the following structure are recovered:

$T_k$-C(O)CF$_2$—O[A-B]$_z$-A-CF$_2$C(O)-T'$_k$ wherein $T_k$ and $T'_k$ are —OCH$_2$CH(CH$_3$)$_2$;
B=—(CF$_2$CF$_2$)$_j$— with j having a number average value equal to 4.5 wherefore the number average length of the segment B is equal to 9.0 carbon atoms;
A=-CF$_2$—O[(CF$_2$O)$_m$(CF$_2$CF$_2$O)$_n$(CF$_2$CF$_2$CF$_2$O)$_p$ (CF$_2$CF$_2$CF$_2$CF$_2$O)$_q$](CF$_2$)$_b$— with m/n=1.25, p/n=0.015 and q/n=0.025 and (p+q)/(n+m+p+q)=0.017, wherein b=0 when A is linked to —CF$_2$C(O)-T'$_k$, while b=1 in all the other cases;
z=8.1.

The number average molecular weight of the polymer of formula (I) is equal to $3.0 \cdot 10^4$ and the percentage by weight of blocks B in the polymer of formula (I) is 12%.

The DSC analysis is carried out which shows a Tg equal to −114° C.

Example 3

In a 500 ml glass flask, equipped with sonde for the temperature, mechanical stirring, bubbling inlet for the gas adduction, 200 g of Galden® HT230 and 100 g of a peroxidic perfluoropolyether of formula:

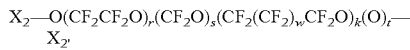

X$_2$—O(CF$_2$CF$_2$O)$_r$(CF$_2$O)$_s$(CF$_2$(CF$_2$)$_w$CF$_2$O)$_k$(O)$_t$—X$_2'$ are introduced, with r/s=1.25, k/(s+r)=0.030, w=1 or 2, t/(s+r+k)=0.17 and wherein X$_2$ and X$_2'$ are —CF$_2$COF with number average molecular weight equal to $3.0 \cdot 10^3$ and PO=2.7.

The reaction mixture is heated under stirring and under nitrogen flow (1 Nl h$^{-1}$) up to 190° C., temperature at which the nitrogen feeding is closed and an equimolar mixture of TFE and ethylene (8 NI h$^{-1}$) is fed. The mixture is maintained under stirring at 190° C. for 1.5 hours, then brought to 200° C. and maintained at this temperature for 1.5 hours and lastly, increased to 210° C. and maintained at this temperature for 1.0 hours.

The TFE feeding is interrupted and that of nitrogen (2 NI h$^{-1}$) opens and the temperature is increased up to 230° C. and maintained constant for 4 hours.

The ratio between the total moles of TFE and ethylene fed and the moles of peroxidic units is equal to 9.5.

One proceeds then to the distillation under vacuum ($10^{-1}$ mbar) of the solvent of Galden® HT230 (kier Tmax=240° C.) obtaining 95 g of product of formula (II).

An aliquot of 50 g is drawn which is dissolved in 250 g of H-Galden® ZT130 and added, dropwise, to 200 g of isobutanol cooled with water ice. At the end of the addition it is left under stirring for one hour, then it is heated to the reflux temperature for 2 hours. One proceeds then to the distillation under vacuum ($10^{-1}$ mbar) of the isobutanol in excess and of H-Galden® ZT130. 51 g of product having the following structure are recovered:

T$_k$-C(O)CF$_2$—O[A-B]$_z$-A-CF$_2$C(O)-T'$_k$ wherein $T_k$ and $T'_k$ are —OCH$_2$CH(CH$_3$)$_2$;
B=—[(CF$_2$CF$_2$)$_j$(CH$_2$CH$_2$)$_{j'}$]— with j/j'=2.2 and with j+j' having a number average value equal to 4.2 wherefore the number average length of the segment B is equal to 8.4 carbon atoms;
A=-CF$_2$—O[(CF$_2$O)$_m$(CF$_2$CF$_2$O)$_n$(CF$_2$CF$_2$CF$_2$O)$_p$ (CF$_2$CF$_2$CF$_2$CF$_2$O)$_q$](CF$_2$)$_b$— wherein m/n=1.24, p/n=0.013 and q/n=0.022 and (p+q)/(n+m+p+q)=0.015, wherein b=0 when A is linked to —CF$_2$C(O)-T'$_k$, while b=1 in all the other cases;
z=2.6.

The number average molecular weight of the polymer of formula (I) is equal to $2.9 \cdot 10^3$ and the percentage by weight of blocks B in the polymer of formula (I) is 29%.

Example 4

The example 3 was repeated using a peroxidic perfluoropolyether of formula:

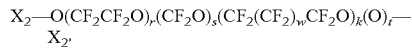

X$_2$—O(CF$_2$CF$_2$O)$_r$(CF$_2$O)$_s$(CF$_2$(CF$_2$)$_w$CF$_2$O)$_k$(O)$_t$—X$_2'$ wherein r/s=1.28, k/(s+r)=0.032, w=1 or 2, t/(s+r+k)=0.15 and wherein X$_2$ and X$_2'$ are —CF$_2$COF, with number average molecular weight equal to $9.2 \cdot 10^3$ and PO=2.4.

All the reaction conditions, except for the different peroxidic perfluoropolyether, are maintained constant. The ratio between the total moles of TFE and ethylene fed and the moles of the peroxidic units is equal to 10.7.

The obtained polymer of formula (I) has the following structure:

T$_k$-C(O)CF$_2$—O[A-B]$_z$-A-CF$_2$C(O)-T'$_k$ wherein $T_k$ and $T'_k$ are —OCH$_2$CH(CH$_3$)$_2$;
B=—[(CF$_2$CF$_2$)$_j$(CH$_2$CH$_2$)$_{j'}$]— with j/j'=2.1 and with j+j' having a number average value equal to 4.4 wherefore the number average length of the segment B is equal to 8.8 carbon atoms;
A=CF$_2$—O[(CF$_2$O)$_m$(CF$_2$CF$_2$O)$_n$(CF$_2$CF$_2$CF$_2$O)$_p$ (CF$_2$CF$_2$CF$_2$CF$_2$O)$_q$]—(CF$_2$)$_b$— with m/n=1.27, p/n=0.014 and q/n=0.023 and (p+q)/(n+m+p+q)=0.016, wherein b=0 when A is linked to the end group CF$_2$C(O)-T'$_k$ while b=1 in all the other cases;
z=6.5.

The number average molecular weight of the polymer of formula (I) results equal to $8.9 \cdot 10^3$ and the percentage of blocks B in the polymer of formula (I) is 25%.

The DSC analysis is carried out which shows a Tg equal to −113° C.

Example 5

Comparative 100 g of Fluorolink® C having the following structure:

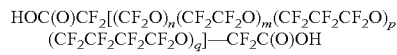

HOC(O)CF$_2$[(CF$_2$O)$_n$(CF$_2$CF$_2$O)$_m$(CF$_2$CF$_2$CF$_2$O)$_p$ (CF$_2$CF$_2$CF$_2$CF$_2$O)$_q$]—CF$_2$C(O)OH wherein n/m=1.18, p/n=0.021, q/n=0.029 and (p+q)/(n+m+p+q)=0.022 and with number average molecular weight equal to $2.0 \cdot 10^3$ is fed into a 250 ml flask. Then 300 g of isobutanol and 10 g of HCl at 37% in water are added. The mixture is heated under reflux for 5 hours, then one proceeds to the distillation under atmospheric pressure, to which an evaporation treatment under vacuum to remove the last traces of isobutanol follows. The product has the following structure:

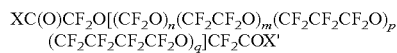

XC(O)CF$_2$O[(CF$_2$O)$_n$(CF$_2$CF$_2$O)$_m$(CF$_2$CF$_2$CF$_2$O)$_p$ (CF$_2$CF$_2$CF$_2$CF$_2$O)$_q$]CF$_2$COX' wherein X, X' are —OCH$_2$CH(CH$_3$)$_2$, wherein n/m=1.18, p/n=0.021, q/n=0.029 and (p+q)/(n+m+p+q)=0.022 and a number average molecular weight equal to 2.1·10$^3$.

Example 6

A polymer (I) having end groups —CH$_2$OH is prepared by using the following procedure.

In a glass flask, equipped with mechanical stirring and bubble condenser, 120 ml of anhydrous diethyl ether and 1.9 g of lithium aluminum hydride in powder (50 mmoles) are fed.

Then 80 g of a mixture of ethyl ether (50 g) and product obtained in the example 1 (30 g, 14 mmoles) are gradually added.

At the end of the addition the reaction mixture is heated under reflux overnight. Then 20 ml of anhydrous methyl alcohol are added to decompose the hydride in excess, to which the addition of 37 g of an aqueous solution at 36% of sulphuric acid follows.

The separation of the organic phase from the aqueous phase is observed. The latter is extracted 4 times with diethyl ether and the resulting ether fractions are joined with the organic phase and anhydrified on calcium sulphate. By distillation of the ethyl ether from the so obtained organic phase, 25 g of product are obtained, which by NMR analysis results to have the following composition:

wherein T$_k$ and T'$_k$ are CH$_2$OH;
B=—(CF$_2$CF$_2$)$_j$— with j having a number average value equal to 3.8 wherefore the number average length of the segment B is equal to 7.9 carbon atoms;
A=-CF$_2$—O[(CF$_2$O)$_m$(CF$_2$CF$_2$O)$_n$(CF$_2$CF$_2$CF$_2$O)$_p$(CF$_2$CF$_2$CF$_2$CF$_2$O)$_q$](CF$_2$)$_b$— wherein m/n=1.24, p/n=0.013 and q/n=0.022 and (p+q)/(n+m+p+q)=0.015, wherein b=0 when A is linked to —CF$_2$C(O)-T'$_k$, while b=1 in all the other cases,
z=2.2.

The number average molecular weight of the polymer of formula (I) is equal to 2.1·10$^3$ and the percentage by weight of blocks B on the copolymer total is 40%.

Example 7

A polymer of formula (I) is prepared having —CONH(CH$_2$)$_3$Si(OC$_2$H$_5$)$_3$ end groups by using the following procedure.

In a 50 ml glass flask 15 g of the product obtained in Example 1 (6.8 mmoles) are introduced to which 3.2 g (13.9 mmoles) of 3-(triethoxysilyl)propylamine are added. The mixture is heated to 40° C. for 4 hours, then the vacuum is progressively applied to remove the isobutanol released from the reaction. At the end of the reaction 15 g of product are obtained having the following formula:

wherein T$_k$ and T'$_k$ are —NH(CH$_2$)$_3$Si(OC$_2$H$_5$)$_3$;
B=—(CF$_2$CF$_2$)$_j$— with j having a number average value equal to 3.8 wherefore the number average length of the segment B is equal to 7.9 carbon atoms;
A=-CF$_2$—O[(CF$_2$O)$_m$(CF$_2$CF$_2$O)$_n$(CF$_2$CF$_2$CF$_2$O)$_p$(CF$_2$CF$_2$CF$_2$CF$_2$O)$_q$](CF$_2$)$_b$— wherein m/n=1.24, p/n=0.013 and q/n=0.022 and (p+q)/(n+m+p+q)=0.015, wherein b=0 when A is linked to —CF$_2$C(O)-T'$_k$, while b=1 in all the other cases,
z=2.2.

The number average molecular weight of the polymer of formula (I) is equal to 2.5·10$^3$ and the percentage by weight of blocks B on the copolymer total is 34%.

Example 8

A polymer of formula (I) is prepared having end groups

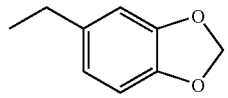

by using the following procedure.

3.0 g of piperonyl alcohol (20 mmoles) are dissolved in 4 ml of CH$_2$Cl$_2$ and cooled at −5° C. 2.3 g of thionyl chloride (20 mmoles) are drop by drop added. An evolution of HCl and of SO$_2$ is observed for a period of about 6 hours.

The mixture is heated to 20° C., then 4 g of NaOH at 50% are added, followed by 11 g of the product obtained in the Example 1 (5.3 mmoles) which are fed for a period of 12 hours under strong stirring.

It is let react for 4 hours, then 15 ml of water are added. A fluorinated phase is separated which is washed twice with water (2.15 ml). Then the fluorinated phase is recovered and anhydrified under vacuum at 80° C.

At the end of the reaction 12 g of product are obtained, having the following formula:

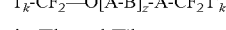

wherein Tk and T'k are:

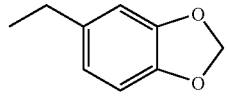

B=—(CF$_2$CF$_2$)$_j$— with j having a number average value equal to 3.8 wherefore the number average length of the segment B is equal to 7.9 carbon atoms;
A=-CF$_2$—O[(CF$_2$O)$_m$(CF$_2$CF$_2$O)$_n$(CF$_2$CF$_2$CF$_2$O)$_p$(CF$_2$CF$_2$CF$_2$CF$_2$O)$_q$](CF$_2$)$_b$— wherein m/n=1.24, p/n=0.013 and q/n=0.022 and (p+q)/(n+m+p+q)=0.015, wherein b=0 when A is linked to —CF$_2$C(O)-T'$_k$, while b=1 in all the other cases;
z=2.2.

The number average molecular weight of the polymer of formula (I) is equal to 2.5·10$^3$ and the percentage by weight of blocks B on the copolymer total is 34%.

Example 9

A polymer of formula (I) is prepared having end groups —CH$_2$—OCH$_2$CH(OH)CH$_2$OH by using the following procedure.

21 g of product of Example 6 (10 mmoles) having CH$_2$OH end groups, 5 ml of t-butanol and 0.22 g of t-BuOK are heated under inert atmosphere to 70° C. After 30 minutes 1.5 g of glycidol are added and the mixture is let react for four hours. After acidification with aqueous HCl, the fluorinated phase is separated, diluted with Galden HT55, washed twice with water and then anhydrified on sodium sulphate. One proceeds then to the distillation of Galden HT55 obtaining 21 g of product having the following composition:

wherein $T_k$ and $T'_k$ are —$CH_2$—$OCH_2CH(OH)CH_2OH$;
B=—$(CF_2CF_2)_j$— with j having number average value equal to 3.8 wherefore the number average length of the segment B is equal to 7.9 carbon atoms;
A=-$CF_2$—$O[(CF_2O)_m(CF_2CF_2O)_n(CF_2CF_2CF_2O)_p (CF_2CF_2CF_2CF_2O)_q](CF_2)_b$— wherein m/n=1.24, p/n=0.013 and q/n=0.022 and (p+q)/(n+m+p+q)=0.015, wherein b=0 when A is linked to —$CF_2C(O)$-$T'_k$, while b=1 in all the other cases;
z=2.2.

The number average molecular weight of the polymer of formula (I) is equal to $2.2 \cdot 10^3$ and the percentage by weight of blocks B on the copolymer total is 37%.

Application Tests

Example 10

On the polymer of Example 3 the wear is measured obtaining a value equal to 0.71 mm.

Example 11

On the polymer of Example 4 the wear is measured obtaining a value equal to 0.78 mm.

Example 12

Comparative

On the product of the Example 5 (comparative) the wear is measured obtaining a value equal to 0.95 mm.

Said wear value results higher than that of the polymer of the Example 3 of the invention having the same molecular weight. Furthermore this wear value (0.95 mm) is also higher than that of the polymer of the example 4 having a much higher molecular weight. This points out that the polymers of the invention, even with high molecular weights, show lower wear values compared with functional PFPEs of the prior art not containing blocks B, B', the functional end group being equal.

Example 13

On the polymer of formula (I) of the example 2 the wear is measured obtaining a value equal to 0.90 mm.

It is to be noted that said wear value results lower than the wear value of the polymer of the example 5 (comparative), even though the polymer of example 5 has a lower molecular weight of about 15 times.

This result is unexpected since it is known, as said, that in the perfluoropolyethers of the prior art the wear notably increases as the molecular weight raises while in the polymers of the invention said increase is limited.

Example 14

A mixture at 5% by weight of the polymer of formula (I) of the Example 1 in Fomblin® M30 is prepared. The mixture wear is equal to 0.63 mm.

The wear of Fomblin® M30 is measured which is equal to 1.33 mm.

By comparing the two values it is evident the reduction action performed by the polymer of the example 1 (reduction of 53%) on the wear of the perfluoropolyether oil Fomblin® M30.

Example 15

Comparative

The example 14 is repeated by using, instead of the polymer of formula (I) of the example 1, the product obtained in the example 5 (comparative). The mixture wear is equal to 0.80 mm.

By comparing the data with those of the example 10 it is evident that the polymer of the example 1 of the invention leads to a higher lowering of the perfluoropolyether oil Fomblin® M30 wear.

Example 16

On the polymer (I) of the example 1 the test of the weight loss at evaporation is carried out, resulting equal to 21% (after 22 hours at 149° C.).

Example 17

Comparative

The example 16 is repeated but using the polymer of the example 5 (comparative) obtaining a weight loss of 39% (after 22 hours at 149° C.).

By comparing the data of the example 16 with those of the example 17 (comparative) it is evident that, the molecular weight and the type of functional end groups being equal, the polymer of the example 1 of the present invention is characterized by a lower weight loss at evaporation.

Example 18

On the polymer (I) of the example 2 the weight loss test at evaporation is then carried out, resulting lower than 0.01% (after 22 hours at 149° C.).

Example 19

A mixture at 35% by weight of polymer of the example 3 in perfluoropolyether oil Fomblin M30 was prepared. The SRV test was then carried out obtaining a friction coefficient value equal to 0.11.

The test was repeated on the oil as such obtaining a value of 0.14.

The data of the examples show that the polymers of the present invention are capable to lower the friction coefficient of perfluoropolyether oil-based compositions.

The invention claimed is:
1. Fluoropolyether polymers of formula (I)

$$Q\text{-}O\text{-}[A\text{-}B]_z\text{-}[A\text{-}B']_z\text{-}A\text{-}Q' \qquad (I)$$

wherein:
A=-$(X)_a$—O-A'-$(X')_b$—
wherein A' is a perfluoropolyether chain comprising one or more repeating units selected from $(CF_2O)$, $(CF_2CF_2O)$, $(CF_2CF_2CF_2O)$, $(CF_2CF_2CF_2CF_2O)$; X, X', equal to or different from each other, are —$CF_2$—, or —$CF_2CF_2$— and optionally —$CF(CF_3)$—;

a, b, equal to or different from each other, are 0 or 1; with the proviso that the block A linked to the Q-O— end group has a=1 and the block A linked to the Q' end group has b=0;

B is a block formed of units deriving from one or more olefins, wherein at least one of them is homopolymerizable by radical route, having formula:

$$—[(CR_1R_2—CR_3R_4)_j(CR_5R_6—CR_7R_8)_{j'}]— \quad (Ia)$$

wherein j is an integer from 1 to 30, j' is an integer from 0 to 29 with the proviso that (j+j') is higher than 2 and lower than 30;

$R_1$, $R_2$, $R_3$, $R_4$, $R_5$, $R_6$, $R_7$, $R_8$, equal to or different from each other, are selected from the group consisting of halogen; H; $C_1$-$C_6$ (per)haloalkyl, wherein the halogen is F, or Cl; $C_1$-$C_6$ alkyl, optionally containing heteroatoms; and $C_1$-$C_6$ oxy(per)fluoroalkyl; said substituents $R_1$-$R_8$ optionally containing one or more functional groups;

B' is a block deriving from one or more olefins and has formula (Ia) but having at least one of the substituents $R_1$ to $R_8$ different than in block B, (j+j') being higher than or equal to 2 and lower than 30;

z is an integer higher than or equal to 2; z' is 0 or an integer; z, z' are such that the number average molecular weight of the polymer of formula (I) is in the range 500-150,000;

Q is a $C_1$-$C_3$ (per)fluoroalkyl end group or a functional end group of formula —(CFW)-$D_q$-$T_k$; Q' is a $C_1$-$C_3$ (per)fluoroalkyl end group or a functional end group of formula $$—(CFW)-D'_q-T'_k,$$

W=F, $CF_3$;

k and q are integers, k ranges from 1 to 4, q is an integer equal to 0 or 1;

D, D' is a bridging group; , and the Tk, Tk' groups are selected from the group consisting of —SH, —SR', —$NR'_2$, —$NH_2$, —NHR', —$SiR'_dL_{3-d}$, wherein L is an OR' group, d is an integer between 0 and 3, —CN, —NCO, —CH=$CH_2$,

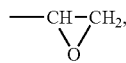

—COR', —$OSO_2CF_3$, —OCOCl, —OCN, —N(R')CN,

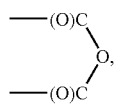

—I, —CHO, —$CH(OCH_3)_2$, —$SO_2Cl$, —$C(OCH_3)$=NH, —$C(NH_2)$=NH, —$CH(OH)CH_2OH$, —$CH(COOH)_2$, —$CH(COOR')_2$, —$CH(CH_2OH)_2$, —$CH(CH_2NH_2)_2$, —$CH(CN)_2$, —$CH(CH_2OCH_2CH$=$CH_2)_2$, —$C(OH)_2CF_3$, —OH, —$CH_2OH$; —COY with Y=OH, OR', $CF_3$, $NH_2$, NHR', NR'R", or halogen;

-$D_g$-$T_k$ and -$D'_g$-$T'_k$ are selected from the group consisting of:

—C(O)$OR_c$ with $R_c$=—$C_3H_7$, or —$C_4H_9$;
—$CH_2OH$;
—$CH_2$—O—$(CH_2CH_2O)_n$H with n between 1 and 3;
—$C(OH)_2CF_3$;
$CH_2OCH_2$—CH(OH)—$CH_2OH$;
—$CH_2NH_2$;
—$CH_2NHR'$;
—$CH_2NR'_2$;
C(O)$NH_2$;
C(O)NHR';
—$CH_2$—O—Ar wherein Ar is an aromatic group, optionally substituted, or an heterocyclic group, pyridine group, optionally substituted; and
—C(O)—NH—$C_nH_{2n}$—Si(OR')$_3$ with n between 1 and 6;

wherein R', R" are an alkyl, cycloaliphatic or aromatic group, R', R" optionally containing fluorine; an aryl radical formed of one or more aromatic rings, optionally condensed; and an heterocyclic radical, with the proviso that at least one of Q, Q' is functional end group.

2. The polymers according to claim 1, wherein A is selected from the following structures:

$$—(X)_aO—[(CF_2O)_n(CF_2CF_2O)_m(CF_2CF_2CF_2O)_p\\(CF_2CF_2CF_2CF_2O)_q—](X)_b— \quad (1)$$

wherein

X, X', equal to or different from each other, are —$CF_2$—, or —$CF_2CF_2$;

a, b are as defined above;

m, n, p, q are integers, zero comprised, such that m/n is between 0.1 and 10 when n is different from zero; (p+q)/(n+m+p+q) is between 0 and 0.05, (n+m+p+q) being different from 0; or $$—(X)_aO—[(CF_2O)_n(CF_2CF_2O)_m(CF_2CF_2CF_2O)_p\\(CF_2CF_2CF_2CF_2O)_q(CF(CF_3)O)_u(CF_2CF(CF_3)\\O)_v]—(X')_b \quad (2)$$

wherein

X, X', equal to or different from each other, are —$CF_2$—, —$CF(CF_3)$—, or —$CF_2CF_2$—;

a and b are as defined above;

m, n, p, q, u, v are integers, including zero, such that (p+q)/(v+m) is between 0 and 0.05 when (v+m) is different from zero; v/(n+m+u) is lower than 50 when (n+m+u) is different from zero.

3. The polymers according to claim 1, wherein block B derives from one or more homopolymerizable olefins by radical route selected from the group consisting of tetrafluoroethylene (TFE), ethylene (E), vinylidene fluoride (VDF), chlorotrifluoroethylene (CTFE), methyl methacrylate, and vinyl acetate, optionally in the presence of non homopolymerizable olefins by radical route selected from the group consisting of hexafluoropropene (HFP), (per)fluorovinylethers, and propylene.

4. The polymers of formula (I) according to claim 1 obtainable from the polymers of formula (II)

$$Q_1\text{-O-[A-B]}_z\text{-[A-B']}_{z'}\text{-A-Q}_1' \quad (II)$$

wherein:

A is as defined in claim 1; B, B', z, z' are as defined in claim 1;

$Q_1$, $Q_1'$, equal to or different from each other, are non functional —$CF_3$, —$C_2F_5$—$C_3F_7$, $CF_2Cl$, —$C_2F_4Cl$ (per)fluoroalkyl end groups, or functional —(CFW)—COY' end groups wherein Y'=F, $CF_3$, OH, $OCH_3$, or $OC_2H_5$, and W is as defined as in claim 1;

with the proviso that at least one of $Q_1$, $Q_1'$ is functional end group, by reaction with the following reactants wherein the terminals -$D_qT_k$ (D'$_q$-T'$_k$) are

| -D$_q$-T$_k$, -D'$_q$-T'$_k$ | Reactant |
|---|---|
| 1 —CONHCH$_2$—CH=CH$_2$ | H$_2$NCH$_2$—CH=CH$_2$ |
| 2 —CONH(CH$_2$)$_3$CO$_2$H | H$_2$N(CH$_2$)$_3$CO$_2$H |
| 3 —CON(CH$_3$)CH$_2$CH$_2$OH | HN(CH$_3$)CH$_2$CH$_2$OH |
| 4 —CONHCH$_2$CH$_2$NH$_2$ | H$_2$NCH$_2$CH$_2$NH$_2$ |
| 5 —CONHCH$_2$CH$_2$SH | H$_2$NCH$_2$CH$_2$SH |
| 6 —CONH(CH$_2$)$_3$Si(OCH$_3$)$_3$ | H$_2$N(CH$_2$)$_3$Si(OCH$_3$)$_3$ |
| 7 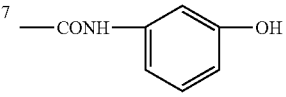 | 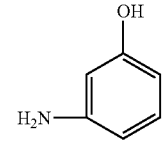 |
| 8 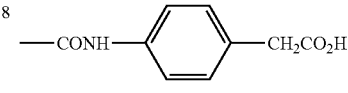 | 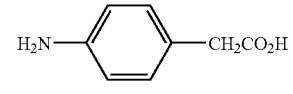 |
| 9 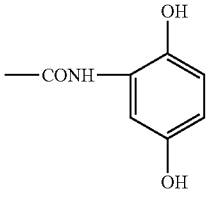 | 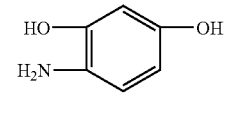 |
| 10 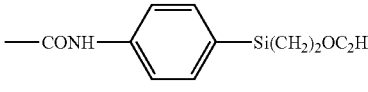 | 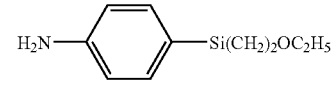 |
| 11 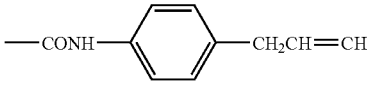 | 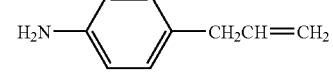 |
| 12 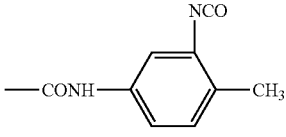 | 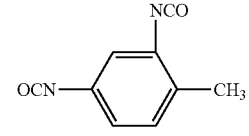 |
| 13 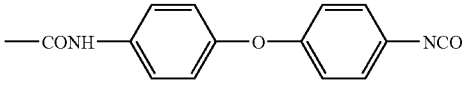 | 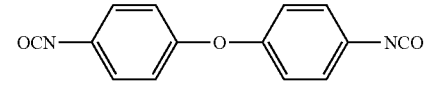 |
| 14 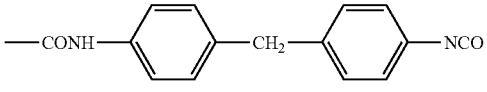 | 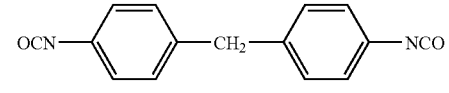 |
| 15 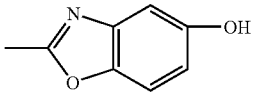 | (1) 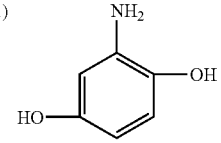<br>(2) Heating |
| 16 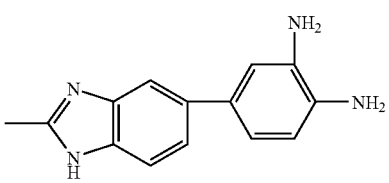 | (1) 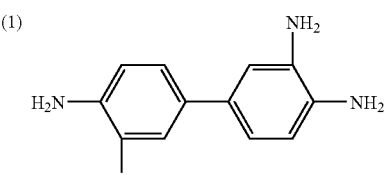<br>(2) Heating |

-continued
| $-D_q-T_k$, $-D'_q-T'_k$ | Reactant |
|---|---|
| 17 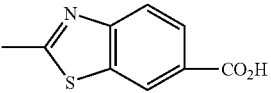 | (1) 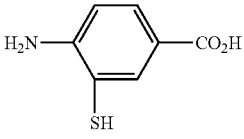<br>(2) Heating |
| 18 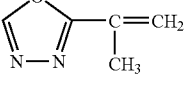 | (1) $H_2NNHCOC(CH)_3=CH_2$ |
| 19 $-CO_2CH_2C(CH_3)_2CH_2OH$ | $HOCH_2C(CH_3)_2CH_2OH$ |
| 20 $-CO_2CH_2CH(OH)CH_3$ | 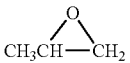 |
| 21 $-CO_2CH_2CH=CH_2$ | $CH_2=CHCH_2OH$ |
| 22 $-CN$ | (1) $NH_3$<br>(2) Dehydration |
| 23 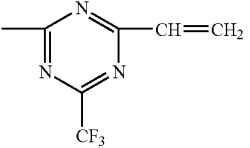 | (1) $NH_3$<br><br><br><br>(2) Dehydration<br>(3) 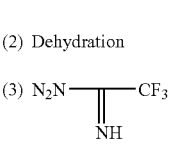<br>(4) $(CH_2=CHCO)_2O$ |
| 24 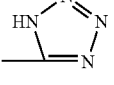 | Compound 22 + $NH_3$ |
| 25 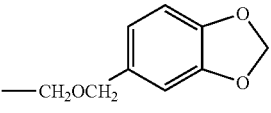 | (1) $LiAlH_4$<br><br><br>(2) 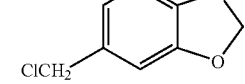 |
| 26  | (1) $LiAlH_4$<br>(2) Epibromohydrin |
| 27 $-CH_2-O-CH_2CH=CH_2$ | (1) $LiAlH_4$<br>(2) $CH_2=CHCH_2Br$ |
| 28 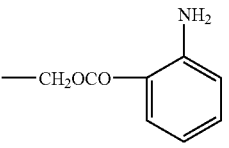 | (1) $LiAlH_4$ |

-continued

| $-D_q-T_k$, $-D'_q-T'_k$ | Reactant |
|---|---|
| | (2) 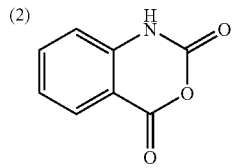 |
| 29 —CH$_2$OSO$_2$F | (1) LiAlH$_4$<br>(2) CF$_3$SO$_2$F + (C$_2$H$_5$)$_3$N |
| 30 —CH$_2$OCN | (1) LiAlH$_4$<br>(2) NCCl + (C$_2$H$_5$)$_3$N |
| 31 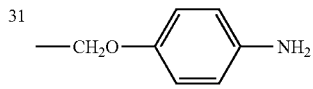 | (1) Compound 29 + 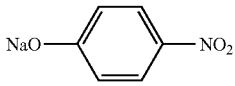<br><br>(2) H$_2$ |
| 32 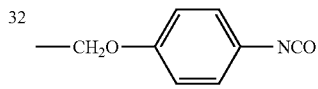 | Compound 31 + phosgene |
| 33 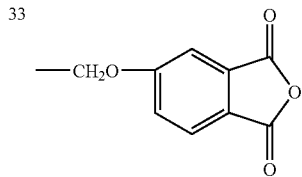 | (1) Compound 29 + 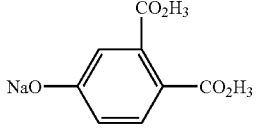<br><br>(2) Hydrolysis<br>(3) Acetic Anhydride |
| 34 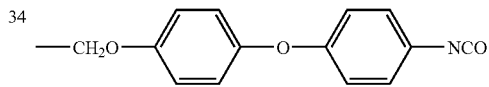 | (1) Compound 29 + <br><br>(2) ClCN + triethylamine |
| 35 —C(NH$_2$)=NH | Compound 22 + NH$_3$ |
| 36 —CH$_2$NCO | (1) Compound 29 + NH$_3$<br>(2) COCl$_2$ |
| 37 —CH$_2$NHCH$_3$ | Compound 29 + CH$_3$NH$_2$ |
| 38 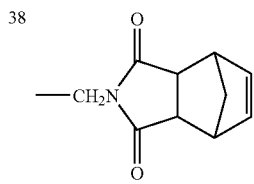 | (1) Compound 29 + NH$_3$<br><br>(2) 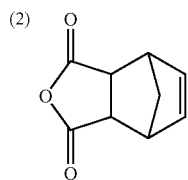 |

-continued

| $-D_q-T_k, -D'_{q'}-T'_k$ | Reactant |
|---|---|
| 39 ![structure: CH2-N-imide-norbornane-Si(CH3)2-OCOCH3] | (1) Compound 38 + Hsi(CH3)2OCOCH3 + H2PtCl6 |
| 40 —CH2OCOC(CH3)=CH2 | (1) LiAlH4<br>(2) CH2=C(CH3)COCl |
| 41 —CH2I | Compound 29 + NaI |
| 42 —CH2SH | (1) Compound 29 + CH3COSNa<br>(2) Hydrolysis |
| 43 —CH3N+≡C— | (1) Compound 29 + NH3<br>(2) HCO2CH3<br>(3) COCl2 + (C2H5)3N |
| 44 —NCO | (1) NaN2<br>(2) Heating |
| 45 —COC6H5 | Cd(C6H5)2 |
| 46 —C(CH3)2OH | (1) CH3MgBr<br>(2) H+ |
| 47 —CHO | LiAlH4 |
| 48 —C(CH3)=CH2 | Compound 46 + P2O5 |
| 49 —CH2N(CN)CH3 | Compound 37 + ClCN + (C2H5)3N |
| 50 —I | (1) Ag2O<br>(2) I2 |
| 51 —CH=CH2 | Compound 47 + CH2=P(C6H5)3 |
| 52 —C(OCH3)=NH | Compound 22 + CH2OH + (C2H5)3N |
| 53 —CH2SO2Cl | Compound 42 + Cl2 + H2O |
| 54 —CH(OCH3)2 | Compound 47 + CH3OH + acid |
| 55 ![structure: —CH2O-phenyl-O-phenyl] | Compound 29 + NaO-phenyl-O-phenyl |
| 56 ![structure: —CH2O-phenyl-O-phenyl-SO2Cl] | Compound 55 + ClSO3H |
| 57 —CH2OH | LiAlH4 |
| 58 —CH2O(CH2CH2O)nH | compound (57) + n ![ethylene oxide] |
| 59 ![structure: —CH2O-phenanthroline with R'2] | compound (57) + ![Cl-phenanthroline with R'2] |
| 60 ![structure: —CH2O-bipyridine with R'2] | compound (57) + ![Cl-bipyridine with R'2] |

-continued
| -D$_q$-T$_k$, -D'$_{q'}$-T'$_k$ | Reactant |
|---|---|
| 61 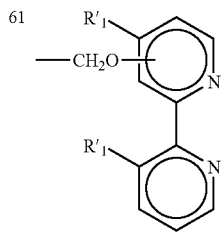 | compound (57) + 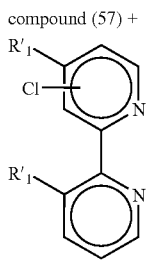 |
| 62 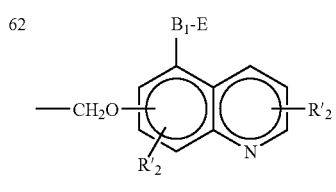 | compound (57) + 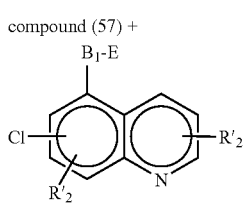 |
| 63 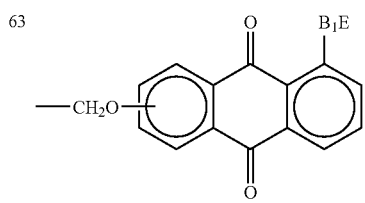 | compound (57) + 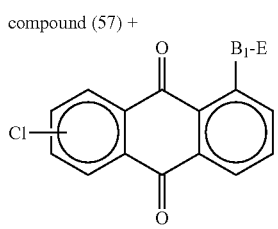 |
| 64 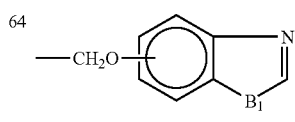 | compound (57) + 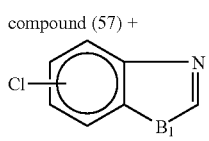 |
| 65 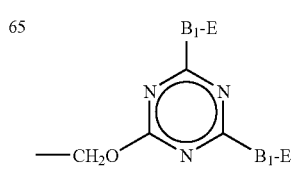 | compound (57) + 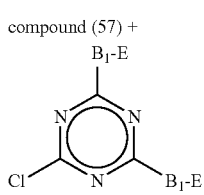 |
| 66 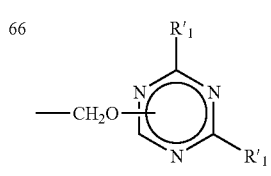 | compound (57) + 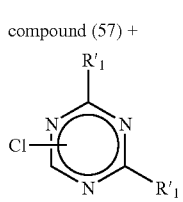 |
| 67 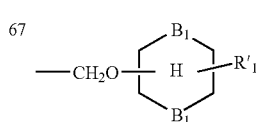 | compound (57) + 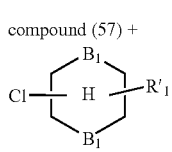 |
| 68 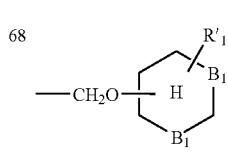 | compound (57) + 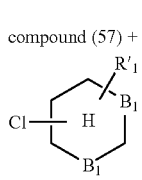 |

-continued
| $-D_q-T_k, -D'_q-T_k$ | Reactant |
|---|---|
| 69 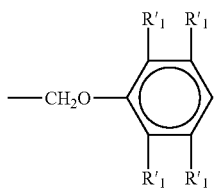 | compound (57) + 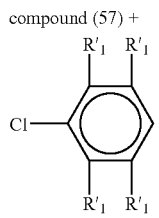 |
| 70 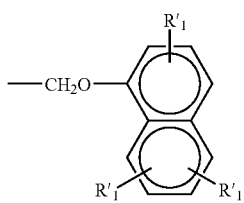 | compound (57) + 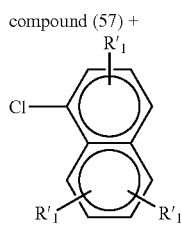 |
| 71 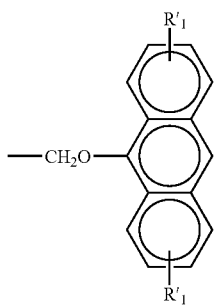 | compound (57) + 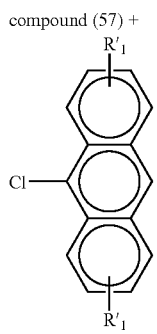 |
| 72 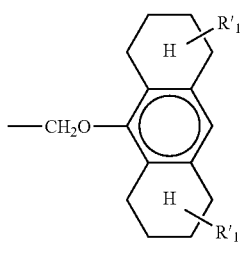 | compound (57) + 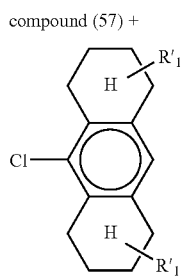 |
| 73 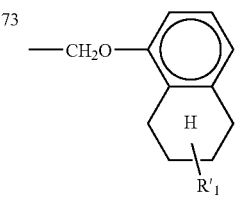 | compound (57) + 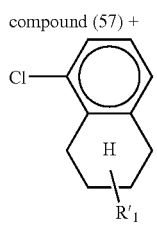 |
| 74 —CH$_2$O—CH$_2$—CH(OH)—CH$_2$OH | compound (57) + 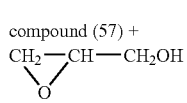 | wherein:
E=$C_1$-$C_3$ alkyl;
R'$_1$=H or $C_1$-$C_3$ alkyl;
B$_1$=oxygen or sulphur;
R'$_2$=Cl, Br, H, $C_1$-$C_3$ alkoxy.

5. A process for preparing the polymers (II) of claim 4 comprising the following steps:
  (a) reaction of a peroxidic perfluoropolyether comprising at least one or more of the following units: ($CF_2O$), ($CF_2CF_2O$), ($CF_2CF_2CF_2O$), ($CF_2CF_2CF_2CF_2O$), (CF($CF_3$)O), (CF($CF_3$)$CF_2O$), or ($CF_2CF(CF_3)O$), having a peroxidic content (PO) between 0.1 and 4,
    with
    at least one homopolymerizable olefin by radical route, optionally in the presence of one or more non homopolymerizable olefins by radical route,
    at temperatures between 125° C. and 280° C. and at a pressure between 1 bar and 50 absolute bar,
    by feeding the olefin until obtaining a reaction mixture having a predetermined PO, wherein the ratio between the total moles of the olefin and the moles of peroxidic units (moles of —O—O— bonds) of the perfluoropolyether is between 1 and 100;
  (b) interruption of the olefin feeding and treatment of the polymer obtained in (a) until removal of the peroxidic content PO obtaining polymers of formula (II).

6. The process according to claim 5, wherein the peroxidic perfluoropolyether is selected from the group consisting of:

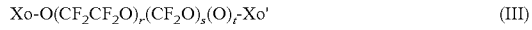

$$Xo\text{-}O(CF_2CF_2O)_r(CF_2O)_s(O)_t\text{-}Xo' \quad (III)$$

wherein
  Xo and Xo', equal to or different from each other, are —$CF_2Cl$, —$CF_2CF_2Cl$, —$CF_3$, —$CF_2CF_3$, —$CF_2COF$, or —COF;
  r, s and t are integers such that the number average molecular weight is generally in the range 400-150,000; r/s is between 0.1 and 10, s being different from zero; t is an integer such that the PO is in the above defined range;

$$X1\text{-}O(CF_2CF_2O)_r(CF_2O)_s(CF(CF_3)O)_u(CF_2CF(CF_3)O)_v(O)_t\text{-}X1' \quad (IV)$$

wherein
  X1 and X1', equal to or different from each other, are —$CF_2Cl$, —$CF_2CF_2Cl$, —$CF_2CF_3$, —$CF_3$, —$C_3F_7$, —CF($CF_3$)COF, or —COF;
  r, s, t, u, v are integers such that the number average molecular weight is in the range 500-150,000; r being optionally zero; v/(r+s+u) is lower than 100, t is a number such that the PO is in the above defined range; and $$X2\text{-}O(CF_2CF_2O)_r(CF_2O)_s(CF_2(CF_2)_wCF_2O)_k(O)_t\text{-}X2' \quad (V)$$

wherein
  X2 and X2', equal to or different from each other, are —$CF_2COF$, or —COF;
  w=1 or 2;
  r, s, t and k are integers such that the number average molecular weight is in the range 700-100,000; r/s is between 0.2 and 10, k/(r+s) is lower than 0.05 and t is an integer such that the PO is as defined above.

7. A method of lubricating a surface, comprising applying the polymers of formula (I) of claim 1 to the surface.

8. A method of improving wear of liquid or solid fluorinated lubricants, comprising adding the polymers of formula (I) of claim 1 to liquid or solid fluorinated lubricants, wherein the amount of polymers of formula (I) added is in the range 0.1%-50% by weight, based on the total weight of the lubricant.

9. Lubricating compositions comprising a fluorinated oil and an additive selected from the group consisting of the polymers (I) as defined in claim 1 and the polymers (II) as defined in claim 8, wherein the fluorinated oil is a perfluoropolyether oil containing one or more of the following repeating units: —CFXO— wherein X is equal to F or $CF_3$; —$CF_2CF_2O$—, —($C_3F_6O$)—, —$CF_2CF_2CF_2O$—, or —$CF_2CF_2CF_2CF_2O$—, said units being statistically distributed along the chain.

10. The compositions according to claim 9, wherein the perfluoropolyether oil is selected from the group consisting of:

$$E_a\text{-}O\text{—}(CF_2CF(CF_3)O)_{m'}(CFWO)_{n'}\text{-}E_a' \quad (1a)$$

wherein
  W is equal to F or $CF_3$;
  Ea and Ea', equal to or different from each other, are selected from $CF_3$, $C_2F_5$ or $C_3F_7$, one fluorine atom of one or of both the end groups being optionally substituted by Cl and/or H;
  m' and n' are integers such that the m'/n' ratio is between 20 and 1,000, n' being different from zero; the various units are statistically distributed along the chain, the product viscosity being as defined above;

$$C_3F_7O(CF(CF_3)CF_2O)_{o'}\text{-}Da \quad (2a)$$

wherein
  Da is equal to —$C_2F_5$ or —$C_3F_7$, one fluorine atom of one or of both the end groups being optionally substituted by Cl and/or H; o' is an integer such that the product viscosity is as defined above;

$$\{C_3F_7\text{—}O\text{—}(CF(CF_3)CF_2O)_{p'}\text{—}CF(CF_3)\text{—}\}_2 \quad (3a)$$

wherein
  p' is an integer such that the product viscosity is as defined above, one F atom of one or of both the end groups $C_3F_7$ being optionally substituted by Cl and/or H;

$$Ea\text{-}O\text{—}(CF_2CF(CF_3)O)_{q'}(C_2F_4O)_{r'}(CFW)_{s'}\text{-}Ea' \quad (4a)$$

wherein
  W is equal to F or $CF_3$;
  Ea and Ea', equal to or different from each other, are as defined above; q', r' and s' are integers and optionally having the value of 0, and such that the product viscosity is as defined above;

$$Ea\text{-}O\text{—}(C_2F_4O)_{t'}(CF_2O)_{u'}\text{-}Ea' \quad (5a)$$

wherein
  Ea and Ea', equal to or different from each other, are as defined above; t' and u' are integers such that the t'/u' ratio is between 0.1 and 5 and the product viscosity is as defined above;

$$Ea\text{-}O\text{—}(CF_2CF_2CF_2O)_{v'}\text{-}Ea' \quad (6a)$$

wherein
  Ea and Ea', equal to or different from each other, are as defined above; v' is a number such that the product viscosity is as defined above;

$$Da\text{-}O\text{—}(CF_2CF_2O)_{z'}\text{-}Da' \quad (7a)$$

wherein
  Da and Da', equal to or different from each other, are selected from $C_2F_5$ or $C_3F_7$, one fluorine atom of one or of both the end groups being optionally substituted by Cl and/or H; z' is an integer such that the product viscosity is as defined above; and $$E_1\text{-}O(CF_2O)_n(CF_2CF_2O)_m(CF_2CF_2CF_2O)_p(CF_2CF_2CF_2CF_2O)_qE_2 \quad (8a)$$

wherein

E$_1$ and E$_2$ are perfluoroalkyl end groups equal to or different from each other, having formula —(CF$_2$)$_z$CF$_3$ wherein z is an integer from 0 to 3; n, m, p, q are integers equal to or different from each other between 0 and 100 and selected so that the oil viscosity is as defined above and such that the m/n ratio is between 2 and 20; (p+q)/(n+m+p+q) is between 0.05 and 0.2; n/(n+m+p+q) is between 0.05 and 0.40, (n+m+p+q) being different from 0.

11. A method of preparing polymers, comprising utilizing the polymers of formula (I) according to claim 1 as macromers in polycondensation or polyaddition reactions.

* * * * *